United States Patent
Okada et al.

(10) Patent No.: US 10,243,242 B2
(45) Date of Patent: Mar. 26, 2019

(54) ELECTROLYTIC SOLUTION, ELECTROCHEMICAL DEVICE, LITHIUM-ION SECONDARY CELL, AND MODULE

(71) Applicant: DAIKIN INDUSTRIES, LTD., Osaka-Shi, Osaka (JP)

(72) Inventors: Michiaki Okada, Osaka (JP); Akinori Tani, Settsu (JP); Shinichi Kinoshita, Settsu (JP); Hiroyuki Arima, Settsu (JP); Tomo Shimada, Settsu (JP); Mayuko Taeda, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/103,906

(22) PCT Filed: Dec. 15, 2014

(86) PCT No.: PCT/JP2014/083132
§ 371 (c)(1),
(2) Date: Jun. 13, 2016

(87) PCT Pub. No.: WO2015/093435
PCT Pub. Date: Jun. 25, 2015

(65) Prior Publication Data
US 2016/0315354 A1 Oct. 27, 2016

(30) Foreign Application Priority Data
Dec. 20, 2013 (JP) ................. 2013-264459

(51) Int. Cl.
*H01M 10/42* (2006.01)
*H01M 10/0567* (2010.01)
*H01M 10/0568* (2010.01)
*H01M 10/0569* (2010.01)
*H01M 10/0525* (2010.01)
*H01M 10/052* (2010.01)
*H01M 2/16* (2006.01)
*H01M 4/131* (2010.01)
*H01M 4/133* (2010.01)
*H01M 4/505* (2010.01)
(Continued)

(52) U.S. Cl.
CPC ..... *H01M 10/4235* (2013.01); *H01M 2/1653* (2013.01); *H01M 4/131* (2013.01); *H01M 4/133* (2013.01); *H01M 4/505* (2013.01); *H01M 4/525* (2013.01); *H01M 4/587* (2013.01); *H01M 4/622* (2013.01); *H01M 4/623* (2013.01); *H01M 4/625* (2013.01); *H01M 4/661* (2013.01); *H01M 10/052* (2013.01); *H01M 10/0525* (2013.01); *H01M 10/0567* (2013.01); *H01M 10/0569* (2013.01); *H01M 10/446* (2013.01); *H01M 4/0404* (2013.01); *H01M 4/0435* (2013.01); *H01M 4/1391* (2013.01); *H01M 2004/027* (2013.01); *H01M 2004/028* (2013.01); *H01M 2220/30* (2013.01); *H01M 2300/004* (2013.01); *H01M 2300/0025* (2013.01); *H01M 2300/0034* (2013.01); *H01M 2300/0042* (2013.01)

(58) Field of Classification Search
CPC ......... H01M 10/0566; H01M 10/0567; H01M 10/0568; H01M 10/0569; H01M 10/0525; H01M 10/4235
See application file for complete search history.

(56) References Cited

U.S. PATENT DOCUMENTS 6,444,360 B2 9/2002 Gan et al.
7,824,578 B2 11/2010 Lee et al.
(Continued)

FOREIGN PATENT DOCUMENTS

JP 7-176322 A 7/1995
JP 2002-302649 A 10/2002
(Continued)

OTHER PUBLICATIONS

Machine translation of JP 2016-091907, published on May 23, 2016 (Year: 2016).*
Machine translation of JP 2015-213045 A, filed on Nov. 26, 2015 (Year: 2015).*
International Preliminary Report on Patentability dated Jun. 21, 2016 from the International Bureau in counterpart International Application No. PCT/JP2014/083132.
(Continued)

Primary Examiner — Anca Eoff
(74) Attorney, Agent, or Firm — Sughrue Mion, PLLC

(57) ABSTRACT

The present invention aims to provide an electrolyte solution that suppresses generation of gas. The electrolyte solution of the present invention includes a non-aqueous solvent (I) containing one or both of a fluorinated cyclic carbonate and a fluorinated acyclic carbonate; an electrolyte salt (II); and a compound (III) represented by the following formula (1):

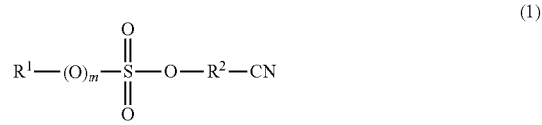

(1)

wherein $R^1$ is a C1-C20 linear or branched alkenyl or alkyl group or a C3-C20 alkyl group having a cyclic structure; m is 0 or 1; $R^2$ is a C1-C20 linear or branched alkylene group or a C3-C20 alkylene group having a cyclic structure, $R^1$ and $R^2$ each may have an oxygen atom between carbon atoms if $R^1$ and $R^2$ each have two or more carbon atoms, but the oxygen atom is not adjacent to another oxygen atom.

11 Claims, No Drawings

(51) Int. Cl.
    *H01M 4/525*    (2010.01)
    *H01M 4/587*    (2010.01)
    *H01M 4/62*    (2006.01)
    *H01M 4/66*    (2006.01)
    *H01M 10/44*    (2006.01)
    *H01M 4/04*    (2006.01)
    *H01M 4/1391*    (2010.01)
    *H01M 4/02*    (2006.01)

(56) References Cited

U.S. PATENT DOCUMENTS

| | | | | |
|---|---|---|---|---|
| 2007/0059588 A1* | 3/2007 | Lee | ............. | H01M 4/131 |
| | | | | 429/65 |
| 2007/0148550 A1* | 6/2007 | Hasegawa | ............. | H01M 4/133 |
| | | | | 429/245 |
| 2009/0208815 A1* | 8/2009 | Dougherty | ............. | H01M 2/1077 |
| | | | | 429/50 |
| 2010/0047695 A1* | 2/2010 | Smart | ............. | H01M 10/0567 |
| | | | | 429/307 |
| 2010/0291437 A1* | 11/2010 | Abe | ............. | C07C 309/65 |
| | | | | 429/207 |
| 2012/0282527 A1* | 11/2012 | Amine | ............. | H01M 4/366 |
| | | | | 429/231.8 |

FOREIGN PATENT DOCUMENTS

| | | | |
|---|---|---|---|
| JP | 2003-7336 A | | 1/2003 |
| JP | 2005-259641 A | | 9/2005 |
| JP | 2013-030284 A | | 2/2013 |
| JP | 2015-213045 A | * | 11/2015 |
| JP | 2016-091907 | * | 5/2016 |
| WO | 2005/069423 A1 | | 7/2005 |
| WO | 2007/061180 A1 | | 5/2007 |
| WO | 2010/018814 A1 | | 2/2010 |

OTHER PUBLICATIONS

International Search Report for PCT/JP2014/083132 dated Mar. 17, 2015 [PCT/ISA/210].

* cited by examiner

ELECTROLYTIC SOLUTION, ELECTROCHEMICAL DEVICE, LITHIUM-ION SECONDARY CELL, AND MODULE

CROSS REFERENCE TO RELATED APPLICATIONS

This application is a National Stage of International Application No. PCT/JP2014/083132, filed on Dec. 15, 2014, which claims priority from Japanese Patent Application No. 2013-264459, filed on Dec. 20, 2013, the contents of all of which are incorporated herein by reference in their entirety.

TECHNICAL FIELD

The present invention relates to electrolyte solutions, electrochemical devices, lithium ion secondary batteries, and modules.

BACKGROUND ART

Rapid improvement of portable electronic devices, such as cellphones and laptops, leads to requirements for higher capacity of batteries used for main power supplies and uninterruptible power supplies of such portable devices. Then, electrochemical devices which are non-aqueous electrolyte batteries, such as lithium ion secondary batteries, have gained attention because such batteries have a higher energy density than nickel-cadmium batteries and nickel-hydrogen batteries.

Typical examples of the electrolyte solution for lithium ion secondary batteries include non-aqueous electrolyte solutions prepared by dissolving an electrolyte (e.g., $LiPF_6$, $LiBF_4$, $LiN(CF_3SO_2)_2$, $LiCF_3(CF_2)_3SO_3$) in a solvent mixture of a high-dielectric-constant solvent (e.g., ethylene carbonate, propylene carbonate) and a low-viscosity solvent (e.g., dimethyl carbonate, diethyl carbonate, ethyl methyl carbonate).

Major negative electrode active materials for lithium ion secondary batteries are carbonaceous materials that can occlude and release lithium ions, and typical examples thereof include natural graphite, artificial graphite, and amorphous carbon. Further, metal- or alloy-based negative electrodes containing silicon, tin, or other elements are also known to provide a much higher capacity. Major positive electrode active materials for the above batteries are transition metal complex oxides that can occlude and release lithium ions. Typical examples of the transition metals include cobalt, nickel, manganese, and iron.

Such lithium ion secondary batteries include highly active positive and negative electrodes. Such electrodes disadvantageously cause side reactions with electrolyte solutions, and these side reactions are known to decrease the charge and discharge capacities. In order to suppress such a disadvantageous battery feature, researchers have performed various studies on non-aqueous solvents and electrolytes.

Patent Literature 1 proposes to use an electrolyte solution containing an organic compound having two or more nitrile groups. The nitrile groups are polarized to give a large dipole moment, and this large dipole moment suppresses oxidative decomposition of the electrolyte solution on the positive electrode during charge at high voltage. Thereby, the above disadvantageous battery feature is suppressed.

Patent Literature 2 discloses an agent for forming films on electrode surfaces. The agent contains a specific nitrile compound, and thus can improve the thermal stability of batteries.

Patent Literature 3 discloses a non-aqueous electrolyte secondary battery that contains a fluorinated nitrile compound in an electrolyte solution and thus has excellent charge and discharge efficiency and storage characteristics.

Patent Literature 4 discloses that addition of a compound having an isocyanate group to a non-aqueous electrolyte solution suppresses a decomposing reaction of a solvent on the negative electrode, and thus improves the cycle characteristics of batteries.

Patent Literature 5 proposes to form a complex of an aliphatic nitrile compound with the surface of a positive electrode active material, and thereby form a protective film on the positive electrode. This improves the safety of batteries against overcharge and/or physical impacts from the outside.

Patent Literature 6 proposes to use a sulfonic acid salt-type compound having at least one substituent selected from the group consisting of a cyano group, an isocyanate group, a thiocyanate group, and an isothiocyanate group so as to improve the life and high-temperature durability of lithium batteries.

Patent Literature 7 proposes to use a sulfuric acid ester-type compound having a $C(sp)-C(sp^3)$ unsaturated hydrocarbon bond so as to improve the high-temperature cycle characteristics of lithium batteries.

CITATION LIST

Patent Literature

Patent Literature 1: JP H07-176322 A
Patent Literature 2: JP 2002-302649 A
Patent Literature 3: JP 2003-7336 A
Patent Literature 4: JP 2005-259641 A
Patent Literature 5: WO 2005/069423
Patent Literature 6: U.S. Pat. No. 7,824,578 B
Patent Literature 7: U.S. Pat. No. 6,444,360 B

SUMMARY OF INVENTION

Technical Problem

Current batteries are required to have much higher performance. In particular, with respect to the high-temperature storage characteristics, batteries need to suppress generation of gas. However, conventional techniques fail to sufficiently suppress generation of gas.

The present invention is devised to solve the above problems, and aims to provide an electrolyte solution that suppresses generation of gas in electrochemical devices that are non-aqueous electrolytic batteries, and to provide an electrochemical device, a lithium ion secondary battery, and a module each including the electrolyte solution.

Solution to Problem

The inventors found that an electrolyte solution containing a fluorinated cyclic carbonate or a fluorinated acyclic carbonate particularly easily generates gas, and that a specific compound having a nitryl group can surprisingly suppress generation of gas. Thereby, the inventors have completed the present invention.

Specifically, the present invention relates to an electrolyte solution including a non-aqueous solvent (I) containing one or both of a fluorinated cyclic carbonate and a fluorinated acyclic carbonate; an electrolyte salt (II); and a compound (III) represented by the following formula (1):

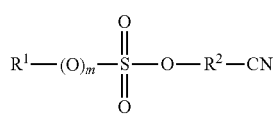

(1)

wherein $R^1$ is a C1-C20 linear or branched alkenyl or alkyl group or a C3-C20 alkyl group having a cyclic structure; m is 0 or 1; $R^2$ is a C1-C20 linear or branched alkylene group or a C3-C20 alkylene group having a cyclic structure, $R^1$ and $R^2$ each may have an oxygen atom between carbon atoms if $R^1$ and $R^2$ each have two or more carbon atoms, but the oxygen atom is not adjacent to another oxygen atom.

Preferably, m is 0.

$R^1$ is preferably —$CH_3$, —$CH_2$—$CH_3$, —$CH_2$—$CH_2$—$CH_3$, —$CH(CH_3)$—$CH_3$, —$CH$=$CH_2$, —$CH_2$—$CH$=$CH_2$, or —$CH_2$—$CH_2$—$CH$=$CH_2$.

$R^2$ is preferably —$CH_2$—, —$CH_2$—$CH_2$—, or —$CH_2$—$CH_2$—$CH_2$—.

The non-aqueous solvent (I) preferably at least contains a fluorinated acyclic carbonate.

The fluorinated cyclic carbonate is preferably at least one compound selected from the group consisting of compounds represented by the following formulas (2) to (6):

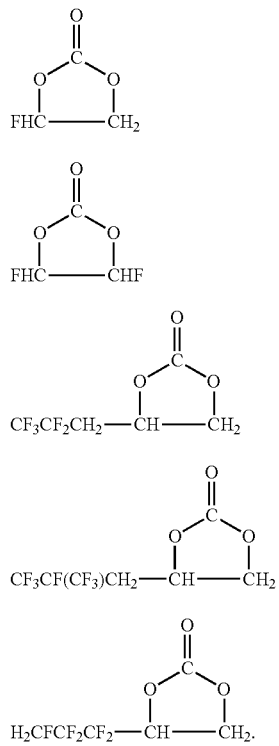

The fluorinated acyclic carbonate is preferably at least one compound selected from the group consisting of (2,2,2-trifluoroethyl)methyl carbonate and (2,2,3,3-tetrafluoropropyl)methyl carbonate.

The present invention also relates to an electrochemical device including the aforementioned electrolyte solution.

The present invention also relates to a lithium ion secondary battery including the aforementioned electrolyte solution.

The present invention also relates to a module including the aforementioned lithium ion secondary battery.

Advantageous Effects of Invention

The present invention can provide an electrolyte solution that is less likely to generate gas, an electrochemical device, a lithium ion secondary battery, and a module.

DESCRIPTION OF EMBODIMENTS

The electrolyte solution of the present invention characteristically includes: a non-aqueous solvent (I) containing one or both of a fluorinated cyclic carbonate and a fluorinated acyclic carbonate; an electrolyte salt (II); and a compound (III) represented by the formula (1).

Use of the electrolyte solution of the present invention enables production of electrochemical devices, such as lithium ion secondary batteries, in which generation of gas is suppressed.

The compound (III) is a compound represented by the formula (1).

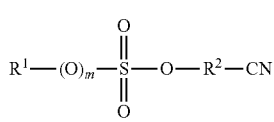

(1)

In the formula (1), $R^1$ is a C1-C20 linear or branched alkenyl or alkyl group or a C3-C20 alkyl group having a cyclic structure. $R^1$ may have an oxygen atom between carbon atoms if $R^1$ has two or more carbon atoms, but the oxygen atom is not adjacent to another oxygen atom, for example, as in the structure represented by —$CH_2$—O—$CH_2$—.

The alkenyl group for $R^1$ is preferably a group represented by $CR'R''$=$CH$—$(CH_2)_{m1}$— wherein R' and R'' may be the same as or different from each other, and are each a hydrogen atom or a C1-C3 alkyl group; and m1 is an integer of 0 to 2.

Examples of the C3-C20 alkyl group having a cyclic structure for $R^1$ include, but not limited to, a cyclopropyl group, a cyclobutyl group, a cyclopentyl group, a cyclohexyl group, a cycloheptyl group, and a cyclooctyl group.

$R^1$ is preferably a C1-C20 linear or branched non-fluorinated alkenyl or non-fluorinated alkyl group, more preferably —$CH_3$, —$CH_2$—$CH_3$, —$CH_2$—$CH_2$—$CH_3$, —$CH(CH_3)$—$CH_3$, —$CH_2$—$CH_2$—$CH_3$, —$CH$=$CH_2$, —$CH_2$—$CH$=$CH_2$, or —$CH_2$—$CH_2$—$CH$=$CH_2$, still more preferably —$CH_3$, —$CH_2$—$CH_3$, —$CH_2$—$CH_2$—$CH_3$, —$CH$=$CH_2$, or —$CH_2$—$CH$=$CH_2$.

$R^1$ preferably has no oxygen atom between carbon atoms.

In the formula (1), $R^2$ is a C1-C20 linear or branched alkylene group or a C3-C20 alkylene group having a cyclic structure. $R^2$ may have an oxygen atom between carbon atoms if $R^2$ has two or more carbon atoms, but the oxygen atom is not adjacent to another oxygen atom, for example, as in the structure represented by —$CH_2$—O—$CH_2$—.

Examples of the C3-C20 alkylene group having a cyclic structure for $R^2$ include, but not limited to, a cyclopropylene group, a cyclobutylene group, a cyclopentylene group, a cyclohexylene group, a cycloheptylene group, and a cyclooctylene group.

$R^2$ is preferably a C1-C20 linear or branched non-fluorinated alkylene group, more preferably —CH$_2$—, —CH$_2$—CH$_2$—, —CH(CH$_3$)—, —CH$_2$—CH$_2$—CH$_2$—, —CH(CH$_3$)—CH$_2$—, or —CH$_2$—CH(CH$_3$)—, still more preferably —CH$_2$—, —CH$_2$—CH$_2$—, or —CH$_2$—CH$_2$—CH$_2$—.

$R^2$ preferably has no oxygen atom between carbon atoms.

In the formula (1), m is 0 or 1. Preferably, m is 0.

The compound (III) is preferably a compound wherein m is 0; $R^1$ is —CH$_3$, —CH$_2$—CH$_3$, —CH$_2$—CH$_2$—CH$_3$, —CH(CH$_3$)—CH$_3$, —CH$_2$—CH$_2$—CH$_3$, —CH═CH$_2$, —CH$_2$—CH═CH$_2$, or —CH$_2$—CH$_2$—CH═CH$_2$; and $R^2$ is —CH$_2$—, —CH$_2$—CH$_2$—, —CH(CH$_3$)—, —CH$_2$—CH$_2$—CH$_2$—, —CH(CH$_3$)—CH$_2$—, or —CH$_2$—CH(CH$_3$)—, more preferably m is 0; $R^1$ is —CH$_3$, —CH$_2$—CH$_3$, —CH$_2$—CH$_2$—CH$_3$, —CH═CH$_2$, or —CH$_2$—CH═CH$_2$; and $R^2$ is —CH$_2$—, —CH$_2$—CH$_2$—, or —CH$_2$—CH$_2$—CH$_2$—.

Particularly preferred compounds for the compound (III) can be specifically represented by the following formulas:

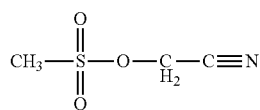
(7)

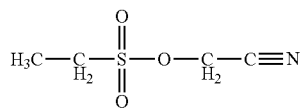
(8)

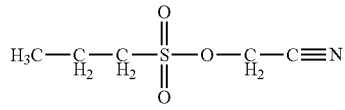
(9)

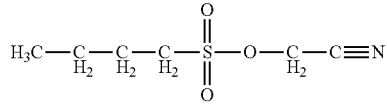
(10)

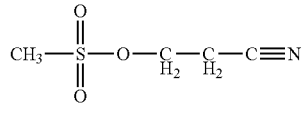
(11)

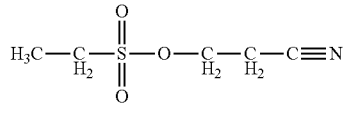
(12)

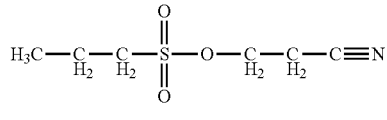
(13)

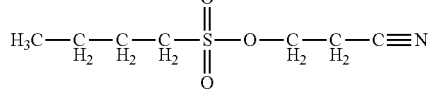
(14)

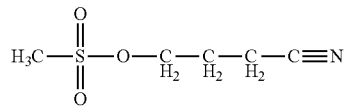
(15)

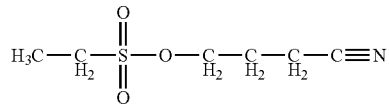
(16)

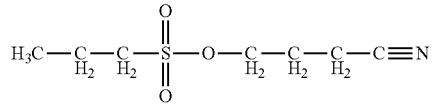
(17)

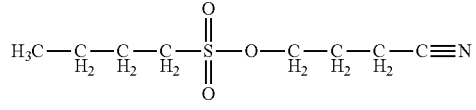
(18)

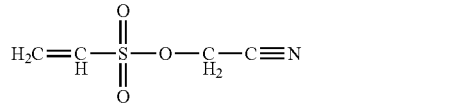
(19)

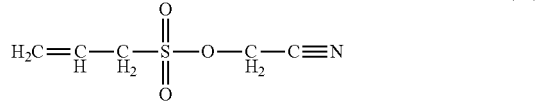
(20)

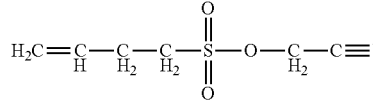
(21)

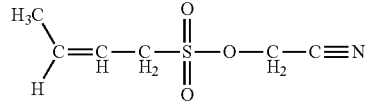
(22)

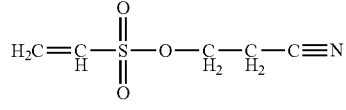
(23)

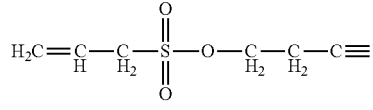
(24)

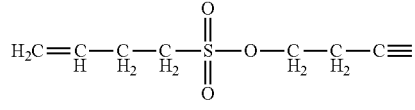
(25)

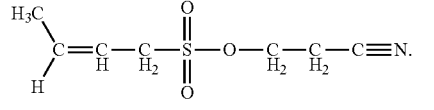
(26)

The compound (III) preferably has a molecular weight of 135 or more, more preferably 149 or more, while preferably 205 or less, more preferably 191 or less.

The compound (III) is preferably present in an amount of 0.01 to 12 mass %, more preferably 0.01 to 10 mass %, in the electrolyte solution of the present invention. The compound (III) in an amount within the above range may lead to an electrolyte solution that suppresses generation of gas.

The amount of the compound (III) in the electrolyte solution is preferably 0.1 mass % or more, more preferably 0.5 mass % or more, still more preferably 1 mass % or more, while preferably 8 mass % or less, more preferably 5 mass % or less.

The electrolyte solution of the present invention further contains a non-aqueous solvent (I) and an electrolyte salt (II), and the non-aqueous solvent (I) contains one or both of a fluorinated cyclic carbonate and a fluorinated acyclic carbonate. The fluorinated cyclic carbonate is a fluorinated saturated cyclic carbonate, and is different from the later-mentioned cyclic carbonate having an unsaturated bond.

(Fluorinated Cyclic Carbonate)

Examples of the fluorinated cyclic carbonate include a fluorinated cyclic carbonate (A) represented by the following formula (A):

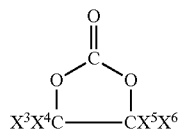

(A)

wherein $X^3$ to $X^6$ may be the same as or different from each other, and are each —H, —F, a fluorinated alkyl group which may optionally have an ether bond, or a fluorinated alkoxy group which may optionally have an ether bond, where at least one of $X^3$ to $X^6$ is —F.

If the non-aqueous solvent (I) contains the fluorinated cyclic carbonate (A) and an electrolyte solution containing this solvent (I) is applied to a lithium ion secondary battery, for example, a stable film can be formed on the negative electrode, so that side reactions of the electrolyte solution on the negative electrode can sufficiently be suppressed. This leads to significantly stable, excellent charge and discharge characteristics.

The term "ether bond" herein means a bond represented by —O—.

In anticipation of a decrease in viscosity at low temperatures, an increase in flash point, and an improvement in solubility of the electrolyte salt, $X^3$ to $X^6$ in the formula (A) are each preferably —H, —F, a fluorinated alkyl group (a), a fluorinated alkyl group (b) having an ether bond, or a fluorinated alkoxy group (c).

In the formula (A), at least one of $X^3$ to $X^6$ is —F. For good dielectric constant and oxidation resistance, at least one or two of $X^3$ to $X^6$ is/are preferably —F.

The fluorinated alkyl group (a) is an alkyl group in which at least one hydrogen atom is replaced by a fluorine atom. The fluorinated alkyl group (a) preferably has a carbon number of 1 to 20, more preferably 2 to 17, still more preferably 2 to 7, particularly preferably 2 to 5.

Too large a carbon number thereof may cause poor low-temperature characteristics and low solubility of the electrolyte salt. Too small a carbon number thereof may cause low solubility of the electrolyte salt, low discharge efficiency, and high viscosity, for example.

Examples of the fluorinated alkyl group (a) having a carbon number of 1 include $CFH_2$—, $CF_2H$—, and $CF_3$—.

In order to achieve good solubility of the electrolyte salt, the fluorinated alkyl group (a) having a carbon number of 2 or greater may be a fluorinated alkyl group represented by the following formula (a-1):

$R^3$-$R^4$—  (a-1)

wherein $R^3$ is an alkyl group which may optionally have a fluorine atom and which has a carbon number of 1 or greater; and $R^4$ is a C1-C3 alkylene group which may optionally have a fluorine atom, where at least one of $R^3$ and $R^4$ has a fluorine atom. $R^3$ and $R^4$ each may further have an atom other than the carbon atom, the hydrogen atom, and the fluorine atom.

$R^3$ is an alkyl group which may optionally have a fluorine atom and which has a carbon number of 1 or greater. $R^3$ is preferably a C1-C16 linear or branched alkyl group. The carbon number of $R^3$ is more preferably 1 to 6, still more preferably 1 to 3.

Specifically, for example, $CH_3$—, $CH_3CH_2$—, $CH_3CH_2CH_2$—, $CH_3CH_2CH_2CH_2$—, and groups represented by the following formulas:

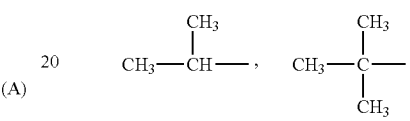

may be mentioned as linear or branched non-fluorinated alkyl groups for $R^3$.

Examples of a linear alkyl group having a fluorine atom for $R^3$ include $CF_3$—, $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CF_2CF_2$—, $CF_3CF_2CH_2CF_2$—, $CF_3CH_2CH_2CH_2CH_2$—, $CF_3CF_2CH_2CH_2CH_2$—, $CF_3CH_2CF_2CH_2CH_2$—, $CF_3CF_2CF_2CH_2CH_2$—, $CF_3CF_2CF_2CF_2CH_2$—, $CF_3CF_2CH_2CF_2CH_2$—, $CF_3CF_2CF_2CF_2CH_2CH_2$—, $CF_3CF_2CH_2CF_2CH_2CH_2$—, $HCF_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, $HCF_2CH_2CF_2CH_2$—, $HCF_2CF_2CF_2CF_2$—, $HCF_2CF_2CH_2CH_2CH_2$—, $HCF_2CH_2CF_2CH_2CH_2$—, $HCF_2CF_2CF_2CF_2CH_2$—, $HCF_2CF_2CF_2CF_2CH_2CH_2$—, $FCH_2$—, $FCH_2CH_2$—, $FCH_2CF_2$—, $FCH_2CF_2CH_2$—, $FCH_2CF_2CF_2$—, $CH_3CF_2CH_2$—, $CH_3CF_2CF_2$—, $CH_3CF_2CH_2CF_2$—, $CH_3CF_2CF_2CF_2$—, $CH_3CH_2CF_2CF_2$—, $CH_3CF_2CF_2CH_2$—, $CH_3CF_2CF_2CH_2CH_2$—, $CH_3CH_2CF_2CF_2CH_2$—, $CH_3CF_2CH_2CF_2CH_2$—, $CH_3CF_2CH_2CF_2CH_2CH_2$—, $HCFClCF_2CH_2$—, $HCF_2CFClCH_2$—, $HCF_2CFClCF_2CFClCH_2$—, and $HCFClCF_2CFClCF_2CH_2$—.

Examples of a branched alkyl group having a fluorine atom for $R^3$ include those represented by the following formulas:

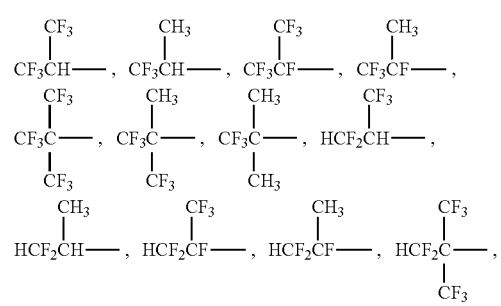

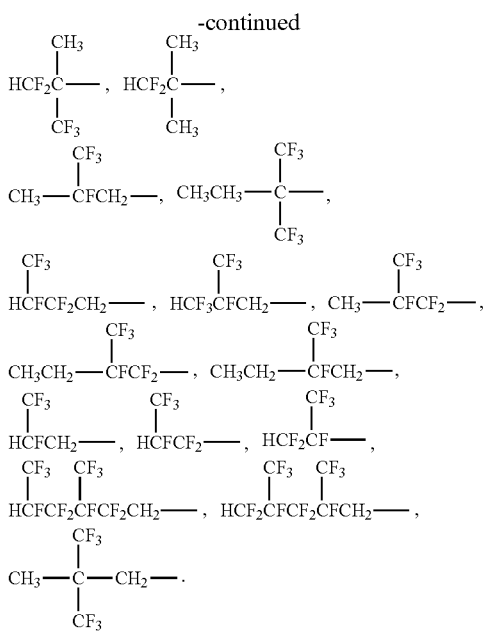

If the group has a branch represented by —CH$_3$ or —CF$_3$, for example, the viscosity is likely to be high. Thus, the number of such branches is more preferably small (one) or zero.

R$^4$ is a C1-C3 alkylene group which may optionally have a fluorine atom. R$^4$ may be a linear or branched group. Examples of a minimum structural unit constituting such a linear or branched alkylene group are shown below. R$^4$ is constituted by one or a combination of these units.

(I) Linear Minimum Structural Units
—CH$_2$—, —CHF—, —CF$_2$—, —CHCl—, —CFCl—, —CCl$_2$—

(II) Branched Minimum Structural Units

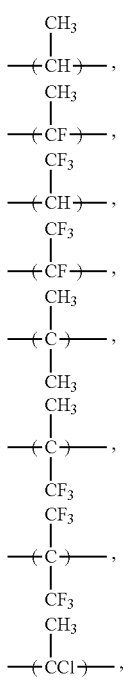

Preferred among these exemplified units are Cl-free structural units because such units are not dehydrochlorinated by a base, and thus are more stable.

If R$^4$ is a linear group, the group consists only of any of the above linear minimum structural units, and it is preferably —CH$_2$—, —CH$_2$CH$_2$—, or CF$_2$—. In order to further improve the solubility of the electrolyte salt, —CH$_2$— or —CH$_2$CH$_2$— is more preferred.

If R$^4$ is a branched group, the group includes at least one of the above branched minimum structural units. Preferred examples thereof include those represented by —(CX$^a$X$^b$)— (wherein X$^a$ is H, F, CH$_3$, or CF$_3$; and X$^b$ is CH$_3$ or CF$_3$, where X$^a$ is H or CH$_3$ if X$^b$ is CF$_3$). Such groups can further improve the solubility of the electrolyte salt.

For example, CF$_3$CF$_2$—, HCF$_2$CF$_2$—, H$_2$CFCF$_2$—, CH$_3$CF$_2$—, CF$_3$CF$_2$CF$_2$—, HCF$_2$CF$_2$CF$_2$—, H$_2$CFCF$_2$CF$_2$—, CH$_3$CF$_2$CF$_2$—, CF$_3$CH$_2$—, HCF$_2$CH$_2$—, CF$_3$CF$_2$CH$_2$—, HCF$_2$CF$_2$CH$_2$—, H$_2$CFCF$_2$CH$_2$—, CH$_3$CF$_2$CH$_2$—, CF$_3$CF$_2$CF$_2$CH$_2$—, CF$_3$CF$_2$CF$_2$CH$_2$—, HCF$_2$CF$_2$CF$_2$CH$_2$—, H$_2$CFCF$_2$CF$_2$CH$_2$—, CH$_3$CF$_2$CF$_2$CH$_2$—, CF$_3$CH$_2$CH$_2$—, HCF$_2$CH$_2$CH$_2$—, CF$_3$CF$_2$CH$_2$CH$_2$—, HCF$_2$CF$_2$CH$_2$CH$_2$—, H$_2$CFCF$_2$CH$_2$CH$_2$—, CH$_3$CF$_2$CH$_2$CH$_2$—, CF$_3$CF$_2$CF$_2$CH$_2$—, HCF$_2$CF$_2$CF$_2$CH$_2$CH$_2$—, H$_2$CFCF$_2$CF$_2$CH$_2$CH$_2$—, CH$_3$CF$_2$CF$_2$CH$_2$CH$_2$—, and those represented by the following formulas:

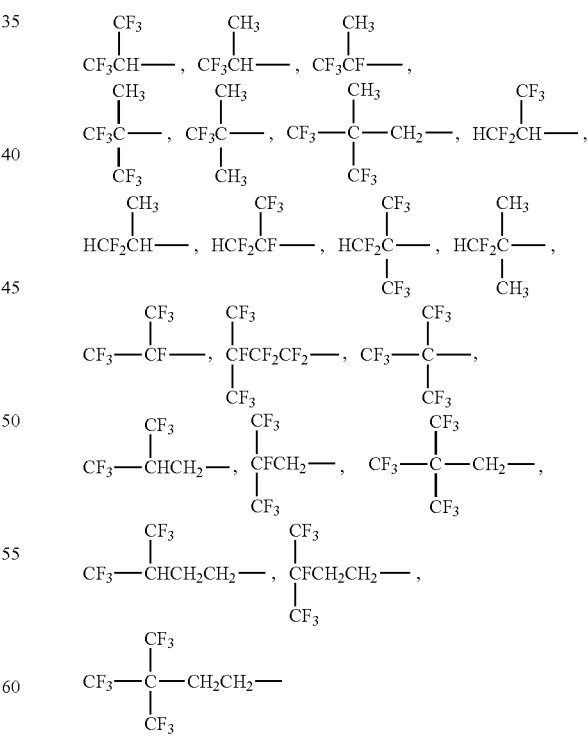

may be mentioned as preferred examples of the fluorinated alkyl group (a).

For example, CF$_3$CH$_2$—, HCF$_2$CH$_2$—, CF$_3$CF$_2$CH$_2$—, HCF$_2$CF$_2$CH$_2$—, H$_2$CFCF$_2$CH$_2$—, CH$_3$CF$_2$CH$_2$—, $CF_3CF_2CF_2CH_2$—, $HCF_2CF_2CF_2CH_2$—, $H_2CFCF_2CF_2CH_2$—, $CH_3CF_2CF_2CH_2$—, $CF_3CH_2CH_2$—, $HCF_2CH_2CH_2$—, $CF_3CF_2CH_2CH_2$—, $HCF_2CF_2CH_2CH_2$—, $H_2CFCF_2CH_2CH_2$—, $CH_3CF_2CH_2CH_2$—, $CF_3CF_2CF_2CH_2CH_2$—, $HCF_2CF_2CF_2CH_2CH_2$—, $H_2CFCF_2CF_2CH_2CH_2$—, $CH_3CF_2CF_2CH_2CH_2$—, and those represented by the following formulas:

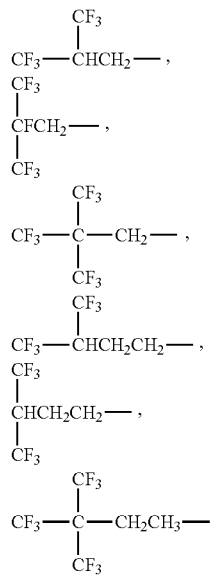

may be mentioned as preferred specific examples of the fluorinated alkyl group (a) wherein $R^4$ is a linear group.

Those represented by the following formulas:

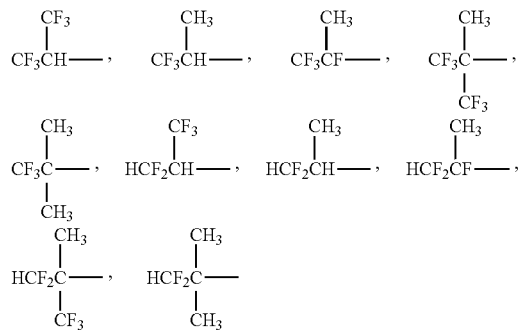

may be mentioned as preferred specific examples of the fluorinated alkyl group (a) wherein $R^4$ is a branched group.

The fluorinated alkyl group (b) having an ether bond is an alkyl group which has an ether bond and in which at least one hydrogen atom is replaced by a fluorine atom. The fluorinated alkyl group (b) having an ether bond preferably has a carbon number of 2 to 17. If the carbon number is too large, the fluorinated cyclic carbonate (A) may be caused to have a high viscosity and an increased number of fluorine-containing groups. This may cause a decrease in dielectric constant and a resulting decrease in solubility of the electrolyte salt, and poor compatibility with other solvents. Accordingly, the carbon number of the fluorinated alkyl group (b) having an ether bond is preferably 2 to 10, more preferably 2 to 7.

The alkylene group constituting the ether portion of the fluorinated alkyl group (b) having an ether bond may be a linear or branched alkylene group. Examples of a minimum structural unit constituting such a linear or branched alkylene group are shown below.

(I) Linear Minimum Structural Units

—$CH_2$—, —CHF—, —$CF_2$—, —CHCl—, —CFCl—, —$CCl_2$—

(II) Branched Minimum Structural Units

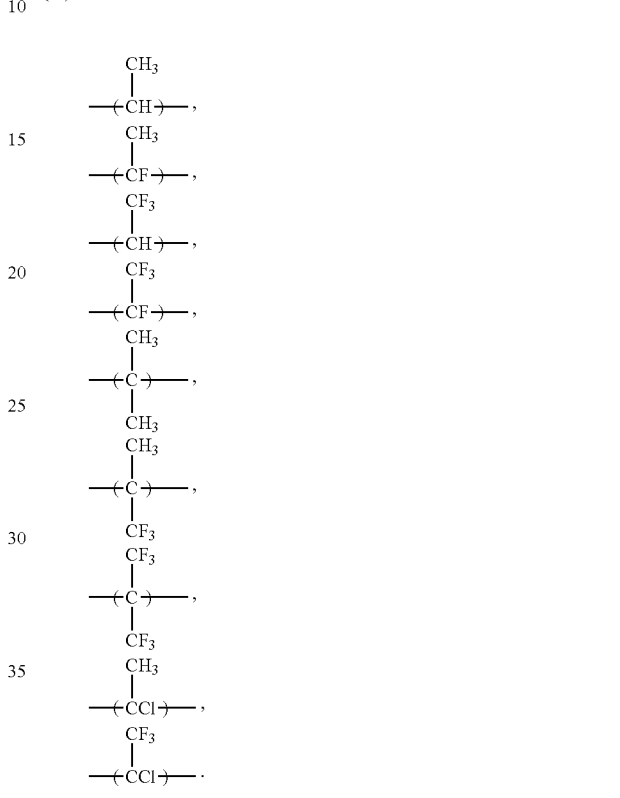

The alkylene group may be constituted by one of these minimum structural units alone, or may be constituted by a combination of linear units (I), of branched units (II), or of a linear unit (I) and a branched unit (II). Preferred specific examples will be mentioned later.

Preferred among these exemplified units are Cl-free structural units because such units are not dehydrochlorinated by a base, and thus are more stable.

Still more preferred examples of the fluorinated alkyl group (b) having an ether bond include those represented by the following formula (b-1):

$$R^5—(OR^6)_{n1}— \qquad (b\text{-}1)$$

wherein $R^5$ is preferably a C1-C6 alkyl group which may optionally have a fluorine atom; $R^6$ is preferably a C1-C4 alkylene group which may optionally have a fluorine atom; n1 is an integer of 1 to 3; and at least one of $R^5$ and $R^6$ has a fluorine atom.

Examples of the groups for $R^5$ and $R^6$ include the following, and any appropriate combination of these groups can provide the fluorinated alkyl group (b) having an ether bond represented by the formula (b-1). Still, the groups are not limited thereto.

(1) $R^5$ is preferably an alkyl group represented by $X^c_3C—(R^7)_{n2}—$ (wherein three $X^c$s may be the same as or different from each other, and are each H or F; $R^7$ is a C1-C5 alkylene group which may optionally have a fluorine atom; and n2 is 0 or 1).

If n2 is 0, $R^5$ is $CH_3$—, $CF_3$—, $HCF_2$—, or $H_2CF$—.

If n2 is 1, specific examples of a linear group for $R^5$ include $CF_3CH_2$—, $CF_3CF_2$—, $CF_3CH_2CH_2$—, $CF_3CF_2CH_2$—, $CF_3CF_2CF_2$—, $CF_3CH_2CF_2$—, $CF_3CH_2CH_2CH_2$—, $CF_3CF_2CH_2CH_2$—, $CF_3CH_2CF_2CH_2$—, $CF_3CF_2CF_2CH_2$—, $CF_3CF_2CF_2CF_2$—, $CF_3CF_2CH_2CF_2$—, $CF_3CH_2CH_2CH_2CH_2$—, $CF_3CF_2CH_2CH_2CH_2$—, $CF_3CH_2CF_2CH_2CH_2$—, $CF_3CF_2CF_2CH_2CH_2$—, $CF_3CF_2CH_2CF_2CH_2$—, $CF_3CF_2CF_2CF_2CH_2$—, $CF_3CH_2CH_2CF_2CH_2$—, $CF_3CH_2CF_2CH_2CH_2$—, $HCF_2CH_2$—, $HCF_2CF_2$—, $HCF_2CH_2CH_2$—, $HCF_2CF_2CH_2$—, $HCF_2CH_2CF_2$—, $HCF_2CF_2CH_2CH_2$—, $HCF_2CH_2CF_2CH_2$—, $HCF_2CF_2CF_2$—, $HCF_2CF_2CH_2CH_2CH_2$—, $HCF_2CH_2CF_2CH_2CH_2$—, $HCF_2CF_2CF_2CF_2CH_2$—, $HCF_2CF_2CF_2CH_2CH_2$—, $FCH_2CH_2$—, $FCH_2CF_2$—, $FCH_2CF_2CH_2$—, $CH_3CF_2$—, $CH_3CH_2$—, $CH_3CF_2CH_2$—, $CH_3CF_2CF_2$—, $CH_3CH_2CH_2$—, $CH_3CF_2CH_2CF_2$—, $CH_3CF_2CF_2CF_2$—, $CH_3CH_2CF_2CF_2$—, $CH_3CH_2CH_2CH_2$—, $CH_3CF_2CH_2CF_2CF_2$—, $CH_3CF_2CF_2CF_2CH_2$—, $CH_3CF_2CH_2CH_2CH_2$—, $CH_3CH_2CF_2CF_2CH_2$—, $CH_3CF_2CH_2CF_2CH_2$—, $CH_3CF_2CH_2CF_2CH_2$—, $CH_3CH_2CF_2CF_2CH_2CH_2$—, and $CH_3CF_2CH_2CF_2CH_2CH_2$—.

If n2 is 1, those represented by the following

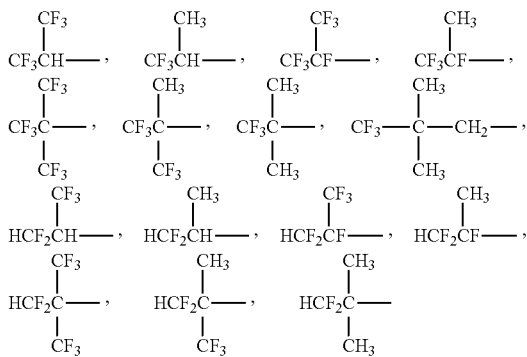

may be mentioned as examples of a branched group for $R^5$.

Branches such as —$CH_3$ and —$CF_3$ may lead to a high viscosity, and thus $R^5$ is more preferably a linear group.

(2) In the moiety —$(OR^6)_{n1}$— of the formula (b-1), n1 is an integer of 1 to 3, preferably 1 or 2. If n1 is 2 or 3, $R^6$s may be the same as or different from each other.

Preferred specific examples of the group for $R^6$ include the following linear or branched groups.

Examples of the linear groups include —$CH_2$—, —CHF—, —$CF_2$—, —$CH_2CH_2$—, —$CF_2CH_2$—, —$CF_2CF_2$—, —$CH_2CF_2$—, —$CH_2CH_2CH_2$—, —$CH_2CH_2CF_2$—, —$CH_2CF_2CH_2$—, —$CH_2CF_2CF_2$—, —$CF_2CH_2CH_2$—, —$CF_2CF_2CH_2$—, —$CF_2CH_2CF_2$—, and —$CF_2CF_2CF_2$—.

Those represented by the following formulas:

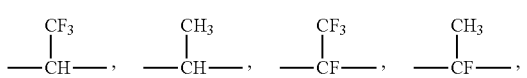

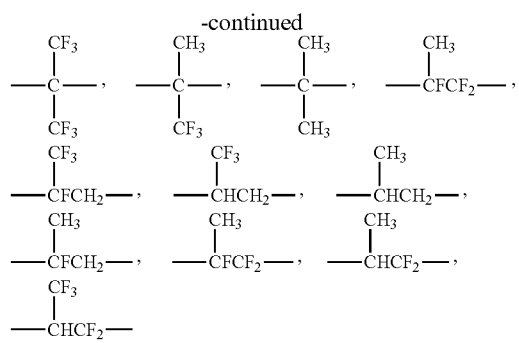

may be mentioned as examples of the branched groups.

The fluorinated alkoxy group (c) is an alkoxy group in which at least one hydrogen atom is replaced by a fluorine atom. The fluorinated alkoxy group (c) preferably has a carbon number of 1 to 17. The carbon number is more preferably 1 to 6.

The fluorinated alkoxy group (c) is particularly preferably a fluorinated alkoxy group represented by $X^d{}_3C$—$(R^8)_{n3}$—O— (wherein three $X^d$s may be the same as or different from each other, and are each H or F; $R^8$ is preferably a C1-C5 alkylene group which may optionally have a fluorine atom; and n3 is 0 or 1, where any of the three $X^d$s contain a fluorine atom).

Specific examples of the fluorinated alkoxy group (c) include fluorinated alkoxy groups in which an oxygen atom is bonded to an end of any alkyl group exemplified for $R^3$ in the formula (a-1).

The fluorinated alkyl group (a), the fluorinated alkyl group (b) having an ether bond, and the fluorinated alkoxy group (c) each preferably have a fluorine content of 10 mass % or more. Too low a fluorine content may lead to an insufficient effect of increasing the flash point. From this point of view, the fluorine content is preferably 10 mass % or more, more preferably 12 mass % or more, still more preferably 15 mass % or more. The upper limit thereof is usually 85 mass %.

The fluorine content of each of the fluorinated alkyl group (a), the fluorinated alkyl group (b) having an ether bond, and the fluorinated alkoxy group (c) is a value calculated by, based on the corresponding structural formula, the following formula:

{(Number of fluorine atoms×19)/(formula weight of the formula)}×100(%).

In order to achieve a good dielectric constant and oxidation resistance, the fluorine content in the whole fluorinated cyclic carbonate (A) is preferably 5 mass % or more, more preferably 10 mass % or more. The upper limit thereof is usually 76 mass %.

The fluorine content in the whole fluorinated cyclic carbonate (A) is a value calculated by, based on the structural formula of the fluorinated cyclic carbonate (A), the following formula:

{(Number of fluorine atoms×19)/(molecular weight of fluorinated cyclic carbonate (A))}×100(%).

Specific examples of the fluorinated cyclic carbonate (A) include fluorinated cyclic carbonates represented by the following formulas:

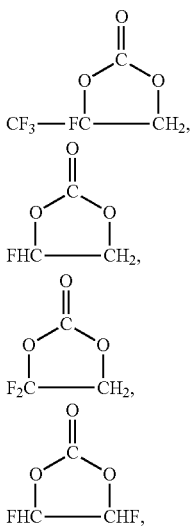

having a high withstand voltage and good solubility of the electrolyte salt.

Further, those represented by the following formulas:

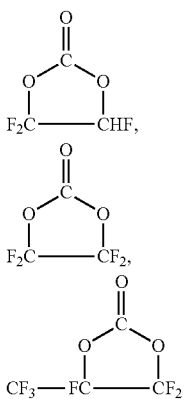

may also be mentioned.

The fluorinated cyclic carbonate (A) in the present invention is not limited to any of the aforementioned specific examples.

Examples of the fluorinated cyclic carbonate include a fluorinated cyclic carbonate (B) represented by the following formula (B):

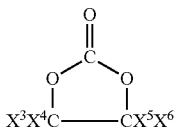

(B)

wherein $X^3$ to $X^6$ may be the same as or different from each other, and are each —H, a fluorinated alkyl group which may optionally have an ether bond, or a fluorinated alkoxy group which may optionally have an ether bond.

Containing the above fluorinated cyclic carbonate (B) leads to more stable, excellent charge and discharge characteristics.

In the formula (B), at least one of $X^3$ to $X^6$ is —H, a fluorinated alkyl group which may optionally have an ether bond, or a fluorinated alkoxy group which may optionally have an ether bond. In order to achieve a good dielectric constant and oxidation resistance, one or two of $X^3$ to $X^6$ is/are preferably —H, a fluorinated alkyl group which may optionally have an ether bond, or a fluorinated alkoxy group which may optionally have an ether bond.

In anticipation of a decrease in viscosity at low temperatures, an increase in flash point, and an improvement in solubility of the electrolyte salt, at least one of $X^3$ to $X^6$ is preferably a fluorinated alkyl group (a), a fluorinated alkyl group (b) having an ether bond, or a fluorinated alkoxy group (c).

Examples of the fluorinated alkyl group (a), the fluorinated alkyl group (b) having an ether bond, and the fluorinated alkoxy group (c) include the same fluorinated alkyl groups (a), fluorinated alkyl groups (b) having an ether bond, and fluorinated alkoxy groups (c) for $X^3$ to $X^6$ in the aforementioned formula (A).

Specific examples of the fluorinated cyclic carbonate (B) include the following.

Those represented by the following formulas:

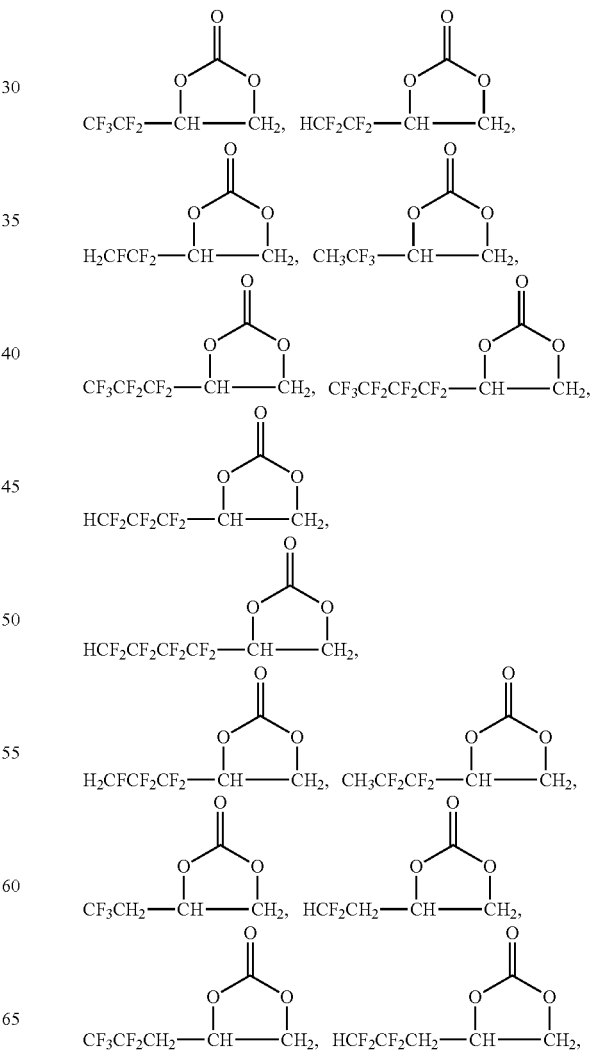

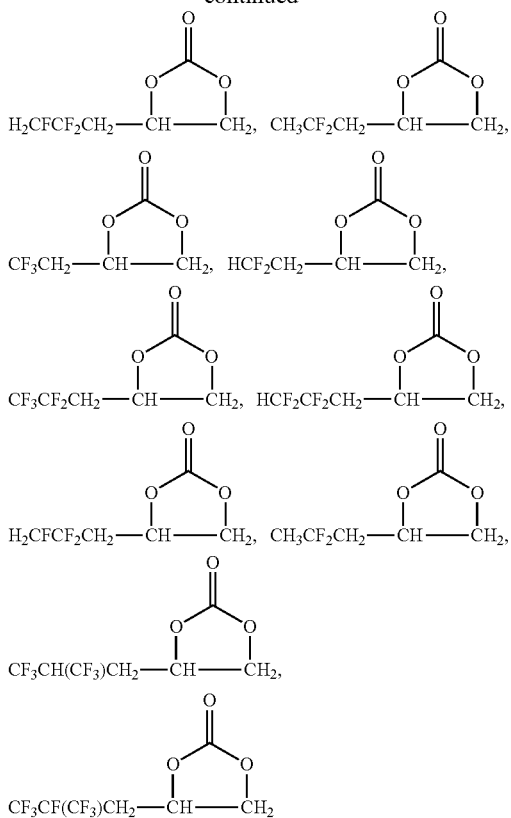

may be mentioned as specific examples of the fluorinated cyclic carbonate (B) represented by the formula (B) in which at least one of $X^3$ to $X^6$ is a fluorinated alkyl group (a) and the others are —H.

For excellent oxidation resistance and low viscosity, compounds represented by the following formulas (2) to (6) are particularly preferred.

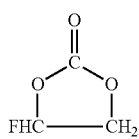 (2)

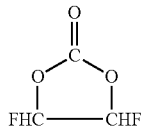 (3)

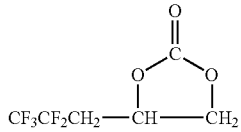 (4)

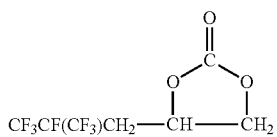 (5)

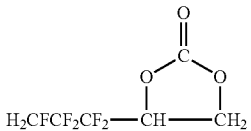 (6)

Those represented by the following formulas:

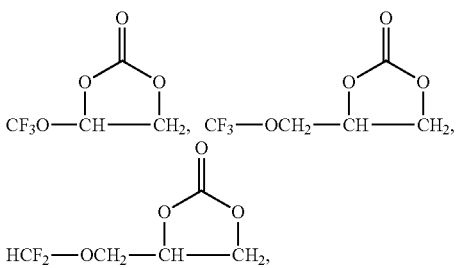

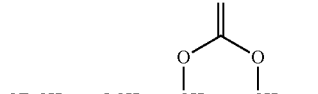

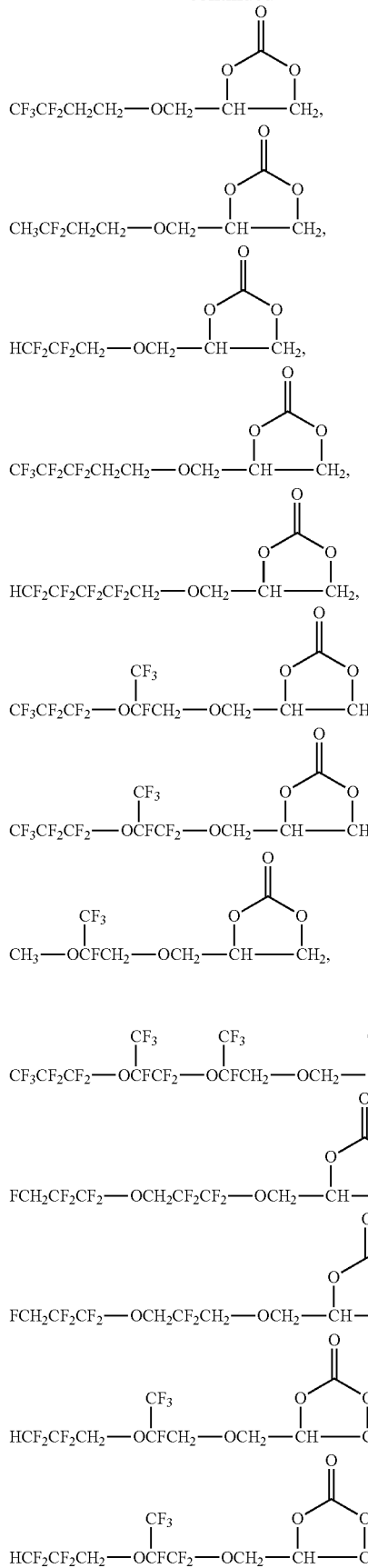
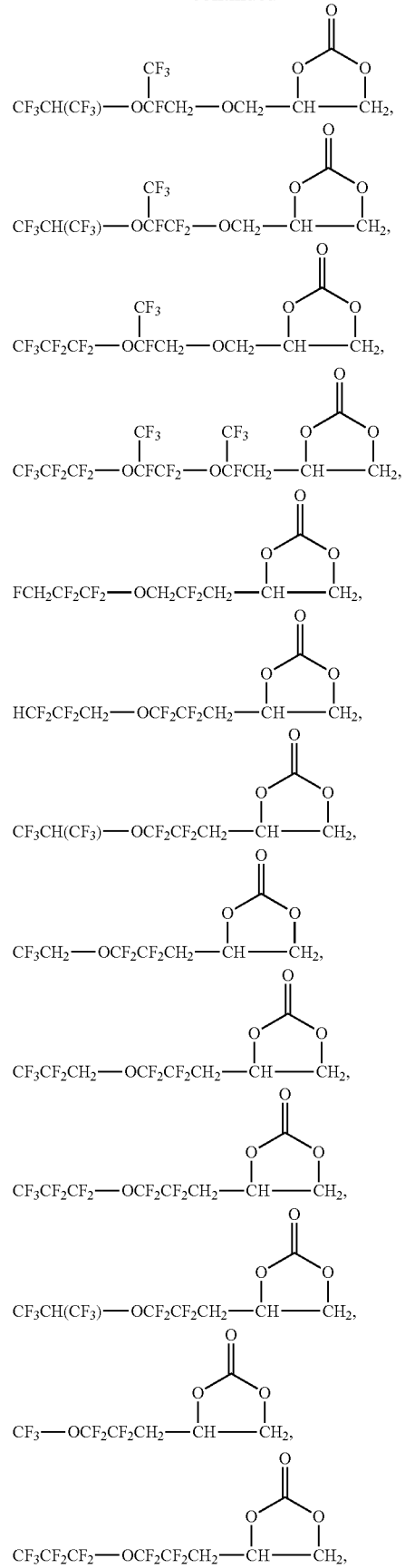

-continued

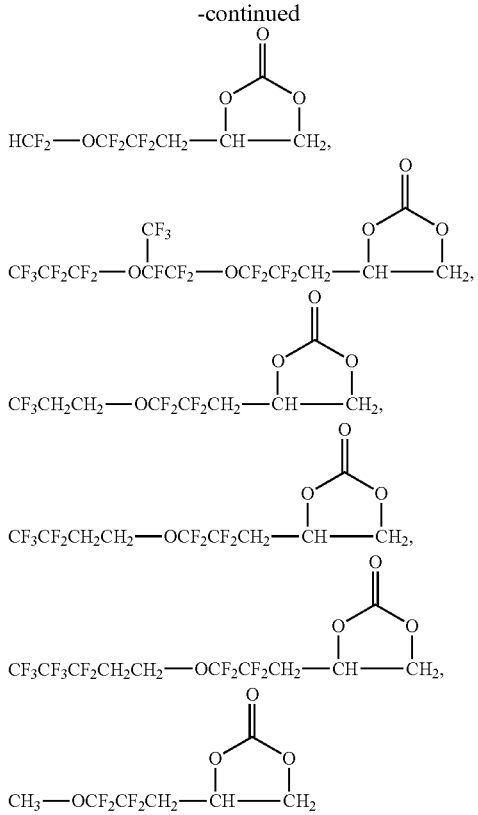

may be mentioned as specific examples of the fluorinated cyclic carbonate (B) represented by the formula (B) in which at least one of $X^3$ to $X^6$ is a fluorinated alkyl group (b) having an ether bond or a fluorinated alkoxy group (c) and the others are —H.

The fluorinated cyclic carbonate (B) should not be limited to the above specific examples.

The amount of the fluorinated cyclic carbonates (A) and (B) and other fluorinated cyclic carbonates is preferably 0.5 vol % or more, more preferably 1 vol % or more, still more preferably 5 vol % or more, particularly preferably 10 vol % or more, in 100 vol % of the non-aqueous solvent (I). The amount thereof is also preferably 50 vol % or less, more preferably 35 vol % or less, still more preferably 25 vol % or less.

(Fluorinated Acyclic Carbonate)

The fluorinated acyclic carbonate is an acyclic carbonate having a fluorine atom.

The fluorinated acyclic carbonate may have any number of fluorine atoms that is one or more, and the number of fluorine atoms is usually six or less, preferably four or less. If the fluorinated acyclic carbonate has multiple fluorine atoms, these fluorine atoms may bond to the same carbon atom, or may bond to different carbon atoms.

Examples of the fluorinated acyclic carbonate include fluorinated dimethyl carbonate and derivatives thereof, fluorinated ethyl methyl carbonate and derivatives thereof, fluorinated diethyl carbonate and derivatives thereof, (2,2,2-trifluoroethyl)methyl carbonate, and (2,2,3,3-tetrafluoropropyl)methyl carbonate.

Examples of the fluorinated dimethyl carbonate and derivatives thereof include fluoromethyl methyl carbonate, difluoromethyl methyl carbonate, trifluoromethyl methyl carbonate, bis(fluoromethyl)carbonate, bis(difluoro)methyl carbonate, and bis(trifluoromethyl)carbonate.

Examples of the fluorinated ethyl methyl carbonate and derivatives thereof include 2-fluoroethyl methyl carbonate, ethyl fluoromethyl carbonate, 2,2-difluoroethyl methyl carbonate, 2-fluoroethyl fluoromethyl carbonate, ethyl difluoromethyl carbonate, 2,2,2-trifluoroethyl methyl carbonate, 2,2-difluoroethyl fluoromethyl carbonate, 2-fluoroethyl difluoromethyl carbonate, and ethyl trifluoromethyl carbonate.

Examples of the fluorinated diethyl carbonate and derivatives thereof include ethyl-(2-fluoroethyl)carbonate, ethyl-(2,2-difluoroethyl)carbonate, bis(2-fluoroethyl)carbonate, ethyl-(2,2,2-trifluoroethyl)carbonate, 2,2-difluoroethyl-2'-fluoroethyl carbonate, bis(2,2-difluoroethyl)carbonate, 2,2,2-trifluoroethyl-2'-fluoroethyl carbonate, 2,2,2-trifluoroethyl-2',2'-difluoroethyl carbonate, and bis(2,2,2-trifluoroethyl)carbonate.

Particularly preferred are (2,2,2-trifluoroethyl)methyl carbonate and (2,2,3,3-tetrafluoropropyl)methyl carbonate.

These fluorinated acyclic carbonates may be used alone or may be used in any combination of two or more at any ratio.

The fluorinated acyclic carbonate is preferably in an amount of 5 vol % or more, more preferably 10 vol % or more, still more preferably 15 vol % or more, in 100 vol % of the non-aqueous solvent (I). Setting such a lower limit may make it easy to adjust the viscosity of an electrolyte solution within an appropriate range, to suppress a decrease in ion conductivity, and as a result to control the large-current discharge characteristics of an electrochemical device containing the electrolyte solution within a favorable range. The amount of the fluorinated acyclic carbonate is also preferably 90 vol % or less, more preferably 85 vol % or less, still more preferably 75 vol %, particularly preferably 65 vol %, in 100 vol % of the non-aqueous solvent (I). Setting such an upper limit may make it easy to avoid a decrease in electric conductivity due to a decrease in dielectric constant of an electrolyte solution, and as a result to control the large-current discharge characteristics of an electrochemical device containing the electrolyte solution within a favorable range.

The non-aqueous solvent (I) also preferably contains a fluorine-free cyclic carbonate, a cyclic carbonate having an unsaturated bond, or a non-fluorinated acyclic carbonate, and more preferably contains all of these carbonates.

(Fluorine-Free Cyclic Carbonate)

Examples of the fluorine-free cyclic carbonate include cyclic carbonates having a C2-C4 alkylene group.

Specific examples of the fluorine-free cyclic carbonates having a C2-C4 alkylene group include ethylene carbonate, propylene carbonate, and butylene carbonate. In order to improve the battery characteristics owing to an improvement in degree of dissociation of lithium ions, ethylene carbonate and propylene carbonate are particularly preferred.

The fluorine-free cyclic carbonates may be used alone or may be used in any combination of two or more at any ratio.

The fluorine-free cyclic carbonate may be in any amount that does not significantly impair the effects of the present invention. In the case of using one fluorine-free cyclic carbonate alone, the amount thereof is preferably 5 vol % or more, more preferably 10 vol % or more, in 100 vol % of the non-aqueous solvent (I). The fluorine-free cyclic carbonate in an amount within this range may make it easy to avoid a decrease in electric conductivity due to a decrease in dielectric constant of an electrolyte solution and to adjust the large-current discharge characteristics, the stability to the negative electrode, and the cycle characteristics of an electrochemical device containing the electrolyte solution each within a favorable range.

The amount thereof is also preferably 95 vol % or less, more preferably 90 vol % or less, still more preferably 85 vol % or less. The fluorine-free cyclic carbonate in an amount within this range may make it easy to adjust the viscosity of an electrolyte solution within an appropriate range, to suppress a decrease in ion conductivity, and as a result to adjust the load characteristics of an electrochemical device containing the electrolyte solution within a favorable range.

(Cyclic Carbonate Having an Unsaturated Bond)

The cyclic carbonate having an unsaturated bond (hereinafter, also referred to as an "unsaturated cyclic carbonate") may be may be any unsaturated carbonate that is a cyclic carbonate having a carbon-carbon double bond or a carbon-carbon triple bond. Cyclic carbonates having an aromatic ring are also included in the unsaturated cyclic carbonate.

Examples of the unsaturated cyclic carbonate include vinylene carbonates, ethylene carbonates substituted with an aromatic ring or a substituent having a carbon-carbon double bond or a carbon-carbon triple bond, phenyl carbonates, vinyl carbonates, allyl carbonates, and catechol carbonates.

Examples of the vinylene carbonates include vinylene carbonate, methyl vinylene carbonate, 4,5-dimethyl vinylene carbonate, phenyl vinylene carbonate, 4,5-diphenyl vinylene carbonate, vinyl vinylene carbonate, 4,5-divinyl vinylene carbonate, allyl vinylene carbonate, 4,5-diallyl vinylene carbonate, 4-fluorovinylene carbonate, 4-fluoro-5-methyl vinylene carbonate, 4-fluoro-5-phenyl vinylene carbonate, 4-fluoro-5-vinyl vinylene carbonate, and 4-allyl-5-fluorovinylene carbonate.

Specific examples of the ethylene carbonates substituted with an aromatic ring or a substituent having a carbon-carbon double bond or a carbon-carbon triple bond include vinyl ethylene carbonate, 4,5-divinyl ethylene carbonate, 4-methyl-5-vinyl ethylene carbonate, 4-allyl-5-vinyl ethylene carbonate, ethynyl ethylene carbonate, 4,5-diethynyl ethylene carbonate, 4-methyl-5-ethynyl ethylene carbonate, 4-vinyl-5-ethynyl ethylene carbonate, 4-allyl-5-ethynyl ethylene carbonate, phenyl ethylene carbonate, 4,5-diphenyl ethylene carbonate, 4-phenyl-5-vinyl ethylene carbonate, 4-allyl-5-phenyl ethylene carbonate, allyl ethylene carbonate, 4,5-diallyl ethylene carbonate, and 4-methyl-5-allyl ethylene carbonate.

Particularly preferred unsaturated cyclic carbonates are vinylene carbonate, methyl vinylene carbonate, 4,5-dimethyl vinylene carbonate, vinyl vinylene carbonate, 4,5-vinyl vinylene carbonate, allyl vinylene carbonate, 4,5-diallyl vinylene carbonate, vinyl ethylene carbonate, 4,5-divinyl ethylene carbonate, 4-methyl-5-vinyl ethylene carbonate, allyl ethylene carbonate, 4,5-diallyl ethylene carbonate, 4-methyl-5-allyl ethylene carbonate, 4-allyl-5-vinyl ethylene carbonate, ethynyl ethylene carbonate, 4,5-diethynyl ethylene carbonate, 4-methyl-5-ethynyl ethylene carbonate, and 4-vinyl-5-ethynyl ethylene carbonate. Vinylene carbonate, vinyl ethylene carbonate, and ethynyl ethylene carbonate are also particularly preferred because they form a more stable interface protective coating.

The unsaturated cyclic carbonate may have any molecular weight that does not significantly impair the effects of the present invention. The molecular weight thereof is preferably 80 or more and 250 or less. The unsaturated cyclic carbonate having a molecular weight within this range is likely to assure the solubility in a non-aqueous electrolyte solution and to enable sufficient achievement of the effects of the present invention. The molecular weight of the unsaturated cyclic carbonate is more preferably 85 or more and 150 or less.

The unsaturated cyclic carbonate may be produced by any method, and can be produced by any known method appropriately selected.

These unsaturated cyclic carbonates may be used alone or may be used in any combination of two or more at any ratio.

The unsaturated cyclic carbonate may be in any amount that does not impair the effects of the present invention. The amount of the unsaturated cyclic carbonate is preferably 0.001 mass % or more, more preferably 0.01 mass % or more, still more preferably 0.1 mass % or more, in 100 mass % of the non-aqueous solvent (I). The amount thereof is also preferably 5 mass % or less, more preferably 4 mass % or less, still more preferably 3 mass % or less. The unsaturated cyclic carbonate in an amount within the above range may allow an electrochemical device containing the electrolyte solution to easily exert an effect of sufficiently improving the cycle characteristics, and may make it easy to avoid a decrease in high-temperature storage characteristics and a decrease in discharge capacity retention ratio.

(Non-Fluorinated Acyclic Carbonate)

The non-fluorinated acyclic carbonate is preferably a C3-C7 acyclic carbonate free from a fluorine atom, more preferably a C3-C7 dialkyl carbonate.

Examples of the acyclic carbonate include dimethyl carbonate, diethyl carbonate, di-n-propyl carbonate, diisopropyl carbonate, n-propyl isopropyl carbonate, ethyl methyl carbonate, methyl-n-propyl carbonate, n-butyl methyl carbonate, isobutyl methyl carbonate, t-butyl methyl carbonate, ethyl-n-propyl carbonate, n-butyl ethyl carbonate, isobutyl ethyl carbonate, and t-butyl ethyl carbonate.

Preferred are dimethyl carbonate, diethyl carbonate, di-n-propyl carbonate, diisopropyl carbonate, n-propyl isopropyl carbonate, ethyl methyl carbonate, and methyl-n-propyl carbonate, particularly preferred are dimethyl carbonate, diethyl carbonate, and ethyl methyl carbonate.

These non-fluorinated acyclic carbonates may be used alone or may be used in any combination of two or more at any ratio.

The non-fluorinated acyclic carbonate is preferably in an amount of 5 vol % or more, more preferably 10 vol % or more, still more preferably 15 vol % or more, in 100 vol % of the non-aqueous solvent (I). Setting such a lower limit may make it easy to adjust the viscosity of an electrolyte solution within an appropriate range, to suppress a decrease in ion conductivity, and as a result to adjust the large-current discharge characteristics of an electrochemical device containing the electrolyte solution within a favorable range. The amount of the acyclic carbonate is also preferably 90 vol % or less, more preferably 85 vol % or less, in 100 vol % of the non-aqueous solvent (I). Setting such an upper limit may make it easy to avoid a decrease in electric conductivity due to a decrease in dielectric constant of an electrolyte solution and to adjust the large-current discharge characteristics of an electrochemical device containing the electrolyte solution within a favorable range.

The non-aqueous solvent (I) may further contain any of cyclic carboxylates, acyclic carboxylates, ether compounds, and others.

(Cyclic Carboxylate)

The cyclic carboxylate preferably has 3 to 12 carbon atoms.

Specific examples thereof include gamma-butyrolactone, gamma-valerolactone, gamma-caprolactone, and epsilon-caprolactone. Particularly preferred is gamma-butyrolactone because it can improve the battery characteristics owing to an improvement in degree of dissociation of lithium ions.

These cyclic carboxylates may be used alone or may be used in any combination of two or more at any ratio.

The cyclic carboxylate is usually preferably in an amount of 5 vol % or more, more preferably 10 vol % or more, in 100 vol % of the non-aqueous solvent (I). The cyclic carboxylate in an amount within this range is likely to improve the electric conductivity of a non-aqueous electrolyte solution and to improve the large-current discharge characteristics of an electrochemical device containing the electrolyte solution. The amount of the cyclic carboxylate is also preferably 50 vol % or less, more preferably 40 vol % or less. Setting such an upper limit may make it easy to adjust the viscosity of a non-aqueous electrolyte solution within an appropriate range, to avoid a decrease in electric conductivity, to suppress an increase in resistance of the negative electrode, and to adjust the large-current discharge characteristics of a non-aqueous electrolyte secondary battery within a favorable range.

(Acyclic Carboxylate)

The acyclic carboxylate preferably has three to seven carbon atoms. Specific examples thereof include methyl acetate, ethyl acetate, n-propyl acetate, isopropyl acetate, n-butyl acetate, isobutyl acetate, t-butyl acetate, methyl propionate, ethyl propionate, n-propyl propionate, isopropyl propionate, n-butyl propionate, isobutyl propionate, t-butyl propionate, methyl butyrate, ethyl butyrate, n-propyl butyrate, isopropyl butyrate, methyl isobutyrate, ethyl isobutyrate, n-propyl isobutyrate, and isopropyl isobutyrate.

In order to improve the ion conductivity owing to a decrease in viscosity, preferred are methyl acetate, ethyl acetate, n-propyl acetate, n-butyl acetate, methyl propionate, ethyl propionate, n-propyl propionate, isopropyl propionate, methyl butyrate, and ethyl butyrate, for example.

These acyclic carboxylates may be used alone or may be used in any combination of two or more at any ratio.

The acyclic carboxylate is usually preferably in an amount of 10 vol % or more, more preferably 15 vol % or more, in 100 vol % of the non-aqueous solvent (I). Setting such a lower limit makes it easy to improve the electric conductivity of an electrolyte solution and to improve the large-current discharge characteristics of an electrochemical device containing the electrolyte solution. The amount of the acyclic carboxylate is also preferably 60 vol % or less, more preferably 50 vol % or less, in 100 vol % of the non-aqueous solvent (I). Setting such an upper limit may make it easy to suppress an increase in resistance of the negative electrode and to adjust the large-current discharge characteristics and cycle characteristics of an electrochemical device containing the electrolyte solution within a favorable range.

(Ether Compound)

The ether compound is preferably a C3-C10 acyclic ether or a C3-C6 cyclic ether in each of which the hydrogen atoms may be partially replaced by fluorine atoms.

Examples of the C3-C10 acyclic ether include diethyl ether, di(2-fluoroethyl)ether, di(2,2-difluoroethyl)ether, di(2,2,2-trifluoroethyl)ether, ethyl(2-fluoroethyl)ether, ethyl(2,2,2-trifluoroethyl)ether, ethyl(1,1,2,2-tetrafluoroethyl)ether, (2-fluoroethyl) (2,2,2-trifluoroethyl)ether, (2-fluoroethyl)(1,1,2,2-tetrafluoroethyl)ether, (2,2,2-trifluoroethyl) (1,1,2,2-tetrafluoroethyl)ether, ethyl-n-propyl ether, ethyl(3-fluoro-n-propyl)ether, ethyl(3,3,3-trifluoro-n-propyl)ether, ethyl(2,2,3,3-tetrafluoro-n-propyl)ether, ethyl(2,2,3,3,3-pentafluoro-n-propyl)ether, 2-fluoroethyl-n-propyl ether, (2-fluoroethyl) (3-fluoro-n-propyl) ether, (2-fluoroethyl) (3,3,3-trifluoro-n-propyl) ether, (2-fluoroethyl) (2,2,3,3-tetrafluoro-n-propyl) ether, (2-fluoroethyl) (2,2,3,3,3-pentafluoro-n-propyl)ether, 2,2,2-trifluoroethyl-n-propyl ether, (2,2,2-trifluoroethyl) (3-fluoro-n-propyl)ether, (2,2,2-trifluoroethyl) (3,3,3-trifluoro-n-propyl)ether, (2,2,2-trifluoroethyl) (2,2,3,3-tetrafluoro-n-propyl)ether, (2,2,2-trifluoroethyl) (2,2,3,3,3-pentafluoro-n-propyl)ether, (1,1,2,2-tetrafluoroethyl-n-propyl ether, (1,1,2,2-tetrafluoroethyl)(3-fluoro-n-propyl)ether, (1,1,2,2-tetrafluoroethyl) (3,3,3-trifluoro-n-propyl) ether, (1,1,2,2-tetrafluoroethyl) (2,2,3,3-tetrafluoro-n-propyl)ether, (1,1,2,2-tetrafluoroethyl) (2,2,3,3,3-pentafluoro-n-propyl)ether, di-n-propyl ether, (n-propyl) (3-fluoro-n-propyl)ether, (n-propyl)(3,3,3-trifluoro-n-propyl)ether, (n-propyl)(2,2,3,3-tetrafluoro-n-propyl)ether, (n-propyl)(2,2,3,3,3-pentafluoro-n-propyl)ether, di(3-fluoro-n-propyl) ether, (3-fluoro-n-propyl) (3,3,3-trifluoro-n-propyl) ether, (3-fluoro-n-propyl) (2,2,3,3-tetrafluoro-n-propyl) ether, (3-fluoro-n-propyl) (2,2,3,3,3-pentafluoro-n-propyl)ether, di(3,3,3-trifluoro-n-propyl)ether, (3,3,3-trifluoro-n-propyl)(2,2,3,3-tetrafluoro-n-propyl)ether, (3,3,3-trifluoro-n-propyl) (2,2,3,3,3-pentafluoro-n-propyl)ether, di(2,2,3,3-tetrafluoro-n-propyl)ether, (2,2,3,3-tetrafluoro-n-propyl)(2,2,3,3,3-pentafluoro-n-propyl)ether, di(2,2,3,3,3-pentafluoro-n-propyl)ether, di-n-butyl ether, dimethoxy methane, methoxy ethoxy methane, methoxy(2-fluoroethoxy)methane, methoxy(2,2,2-trifluoroethoxy)methane, methoxy(1,1,2,2-tetrafluoroethoxy)methane, diethoxy methane, ethoxy(2-fluoroethoxy)methane, ethoxy(2,2,2-trifluoroethoxy)methane, ethoxy(1,1,2,2-tetrafluoroethoxy) methane, di(2-fluoroethoxy)methane, (2-fluoroethoxy)(2,2,2-trifluoroethoxy)methane, (2-fluoroethoxy) (1,1,2,2-tetrafluoroethoxy)methane, di(2,2,2-trifluoroethoxy) methane, (2,2,2-trifluoroethoxy) (1,1,2,2-tetrafluoroethoxy) methane, di(1,1,2,2-tetrafluoroethoxy)methane, dimethoxy ethane, methoxy ethoxy ethane, methoxy(2-fluoroethoxy) ethane, methoxy(2,2,2-trifluoroethoxy)ethane, methoxy(1,1,2,2-tetrafluoroethoxy)ethane, diethoxy ethane, ethoxy(2-fluoroethoxy)ethane, ethoxy(2,2,2-trifluoroethoxy)ethane, ethoxy(1,1,2,2-tetrafluoroethoxy)ethane, di(2-fluoroethoxy) ethane, (2-fluoroethoxy)(2,2,2-trifluoroethoxy)ethane, (2-fluoroethoxy) (1,1,2,2-tetrafluoroethoxy)ethane, di(2,2,2-trifluoroethoxy)ethane, (2,2,2-trifluoroethoxy) (1,1,2,2-tetrafluoroethoxy)ethane, di(1,1,2,2-tetrafluoroethoxy)ethane, ethylene glycol di-n-propyl ether, ethylene glycol di-n-butyl ether, and diethylene glycol dimethyl ether.

Examples of the C3-C6 cyclic ether include tetrahydrofuran, 2-methyl tetrahydrofuran, 3-methyl tetrahydrofuran, 1,3-dioxane, 2-methyl-1,3-dioxane, 4-methyl-1,3-dioxane, 1,4-dioxane, and fluorinated compounds thereof.

Preferred are dimethoxy methane, diethoxy methane, ethoxy methoxy methane, ethylene glycol di-n-propyl ether, ethylene glycol di-n-butyl ether, and diethylene glycol dimethyl ether because they have a high ability to solvate with lithium ions and improve the ion dissociation. Particularly preferred are dimethoxy methane, diethoxy methane, and ethoxy methoxy methane because they have a low viscosity and give a high ion conductivity.

These ether compounds may be used alone or may be used in any combination of two or more at any ratio.

The ether compound is usually preferably in an amount of 5 vol % or more, more preferably 10 vol % or more, still more preferably 15 vol % or more, while preferably 70 vol % or less, more preferably 60 vol % or less, still more preferably 50 vol % or less, in 100 vol % of the non-aqueous solvent (I).

The ether compound in an amount within this range is likely to secure an effect of improving the ion conductivity owing to an improvement in degree of dissociation of lithium ions of a linear ether and a decrease in viscosity, and may make it easy to avoid a decrease in capacity due to co-intercalation of a linear ether together with lithium ions if the negative electrode active material is a carbonaceous material.

The electrolyte solution of the present invention may appropriately further include any other assistant in accordance with the purpose thereof.

Examples of the assistant include those mentioned below, such as unsaturated cyclic carbonates having a fluorine atom, overcharge inhibitors, and other additional assistants.

(Unsaturated Cyclic Carbonate Having a Fluorine Atom)

The unsaturated cyclic carbonate having a fluorine atom may also preferably be a cyclic carbonate having an unsaturated bond and a fluorine atom (hereinafter, also referred to as a "fluorinated unsaturated cyclic carbonate"). The fluorinated unsaturated cyclic carbonate may have any number of fluorine atoms that is 1 or more. The number of fluorine atoms is usually 6 or less, preferably 4 or less, most preferably 1 or 2.

Examples of the fluorinated unsaturated cyclic carbonate include fluorinated vinylene carbonate derivatives and fluorinated ethylene carbonate derivatives substituted with an aromatic ring or a substituent having a carbon-carbon double bond.

Examples of the fluorinated vinylene carbonate derivatives include 4-fluorovinylene carbonate, 4-fluoro-5-methyl vinylene carbonate, 4-fluoro-5-phenyl vinylene carbonate, 4-allyl-5-fluorovinylene carbonate, and 4-fluoro-5-vinyl vinylene carbonate.

Examples of the fluorinated ethylene carbonate derivatives substituted with an aromatic ring or a substituent having a carbon-carbon double bond include 4-fluoro-4-vinyl ethylene carbonate, 4-fluoro-4-allyl ethylene carbonate, 4-fluoro-5-vinyl ethylene carbonate, 4-fluoro-5-allyl ethylene carbonate, 4,4-difluoro-4-vinyl ethylene carbonate, 4,4-difluoro-4-allyl ethylene carbonate, 4,5-difluoro-4-vinyl ethylene carbonate, 4,5-difluoro-4-allyl ethylene carbonate, 4-fluoro-4,5-divinyl ethylene carbonate, 4-fluoro-4,5-diallyl ethylene carbonate, 4,5-difluoro-4,5-divinyl ethylene carbonate, 4,5-difluoro-4,5-diallyl ethylene carbonate, 4-fluoro-4-phenyl ethylene carbonate, 4-fluoro-5-phenyl ethylene carbonate, 4,4-difluoro-5-phenyl ethylene carbonate, and 4,5-difluoro-4-phenyl ethylene carbonate.

More preferred fluorinated unsaturated cyclic carbonates to be used together with the compound of the formula (1) are 4-fluorovinylene carbonate, 4-fluoro-5-methyl vinylene carbonate, 4-fluoro-5-vinyl vinylene carbonate, 4-allyl-5-fluorovinylene carbonate, 4-fluoro-4-vinyl ethylene carbonate, 4-fluoro-4-allyl ethylene carbonate, 4-fluoro-5-vinyl ethylene carbonate, 4-fluoro-5-allyl ethylene carbonate, 4,4-difluoro-4-vinyl ethylene carbonate, 4,4-difluoro-4-allyl ethylene carbonate, 4,5-difluoro-4-vinyl ethylene carbonate, 4,5-difluoro-4-allyl ethylene carbonate, 4-fluoro-4,5-divinyl ethylene carbonate, 4-fluoro-4,5-diallyl ethylene carbonate, 4,5-difluoro-4,5-divinyl ethylene carbonate, and 4,5-difluoro-4,5-diallyl ethylene carbonate because they form a stable interface protective coating.

The fluorinated unsaturated cyclic carbonate may have any molecular weight that does not significantly impair the effects of the present invention. The molecular weight thereof is preferably 50 or more and 250 or less. The fluorinated unsaturated cyclic carbonate having a molecular weight within this range is likely to assure the solubility of the fluorinated cyclic carbonate in an electrolyte solution and may make it easy to exert the effects of the present invention.

The fluorinated unsaturated cyclic carbonate may be produced by any method, and can be produced by any known method appropriately selected. The molecular weight thereof is more preferably 100 or more and 200 or less.

The above fluorinated unsaturated cyclic carbonates may be used alone or in any combination of two or more at any ratio. The fluorinated unsaturated cyclic carbonate may be in any amount that does not significantly impair the effects of the present invention. The amount of the fluorinated unsaturated cyclic carbonate is usually preferably 0.01 mass % or more, more preferably 0.1 mass % or more, still more preferably 0.2 mass % or more, while also preferably 5 mass % or less, more preferably 4 mass % or less, still more preferably 3 mass % or less, in 100 mass % of the electrolyte solution. The fluorinated unsaturated cyclic carbonate in an amount within this range is likely to allow an electrochemical device containing the electrolyte solution to exert an effect of sufficiently improving the cycle characteristics, and may make it easy to avoid a decrease in high-temperature storage characteristics, an increase in amount of gas generated, and a decrease in discharge capacity retention ratio.

(Overcharge Inhibitor)

An overcharge inhibitor may be used in order to effectively suppress burst or combustion of batteries in case of, for example, overcharge of electrochemical devices containing the electrolyte solution of the present invention.

Examples of the overcharge inhibitor include aromatic compounds such as biphenyl, alkyl biphenyl, terphenyl, partially hydrogenated terphenyl, cyclohexyl benzene, t-butyl benzene, t-amyl benzene, diphenyl ether, and dibenzofuran; partially fluorinated compounds of the above aromatic compounds such as 2-fluorobiphenyl, o-cyclohexyl fluorobenzene, and p-cyclohexyl fluorobenzene; and fluoroanisole compounds such as 2,4-difluoroanisole, 2,5-difluoroanisole, 2,6-difluoroanisole, and 3,5-difluoroanisole. Preferred are aromatic compounds such as biphenyl, alkyl biphenyl, terphenyl, partially hydrogenated terphenyl, cyclohexyl benzene, t-butyl benzene, t-amyl benzene, diphenyl ether, and dibenzofuran. These compounds may be used alone or in combination of two or more. In the case of combination use of two or more compounds, preferred is a combination of cyclohexyl benzene and t-butyl benzene or t-amyl benzene, or a combination of at least one selected from oxygen-free aromatic compounds such as biphenyl, alkyl biphenyl, terphenyl, partially hydrogenated terphenyl, cyclohexyl benzene, t-butyl benzene, and t-amyl benzene, and at least one selected from oxygen-containing aromatic compounds such as diphenyl ether and dibenzofuran. Such combinations may lead to a good balance between the overcharge inhibiting characteristics and the high-temperature storage characteristics.

(Additional Assistant)

The electrolyte solution of the present invention may further contain any other known additional assistant. Examples of such known additional assistant include carbonate compounds such as erythritan carbonate, spiro-bis-dimethylene carbonate, and methoxy ethyl-methyl carbonate; carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenylsuccinic anhydride; spiro compounds such as 2,4,8,10-tetraoxaspiro[5.5]undecane and 3,9-divinyl-2,4,8,10-tetraoxaspiro[5.5]undecane; sulfur-containing compounds such as ethylene sulfite, 1,3-propane sultone, 1-fluoro-1,3-propane sultone, 2-fluoro-1,3-propane sultone, 3-fluoro-1,3-propane sultone, 1-propene-1, 3-sultone, 1-fluoro-1-propene-1,3-sultone, 2-fluoro-1-propene-1,3-sultone, 3-fluoro-1-propene-1,3-sultone, 1,4-butane sultone, 1-butene-1,4-sultone, 3-butene-1,4-sultone, methyl fluorosulfonate, ethyl fluorosulfonate, methyl methanesulfonate, ethyl methanesulfonate, busulfan, sulfolene, diphenyl sulfone, N,N-dimethyl methane sulfoneamide, N,N-diethyl methane sulfoneamide, methyl vinylsulfonate, ethyl vinylsulfonate, allyl vinylsulfonate, propargyl vinylsulfonate, methyl allylsulfonate, ethyl allylsulfonate, allyl allylsulfonate, propargyl allylsulfonate, and 1,2-bis(vinylsulfonyloxy)ethane; nitrogen-containing compounds such as 1-methyl-2-pyrrolidinone, 1-methyl-2-piperidone, 3-methyl-2-oxazolidinone, 1,3-dimethyl-2-imidazolidinone, and N-methylsuccinimide; phosphorous-containing compounds such as trimethyl phosphonate, triethyl phosphonate, triphenyl phosphonate, trimethyl phosphate, triethyl phosphate, triphenyl phosphate, dimethyl methylphosphonate, diethyl ethylphosphonate, dimethyl vinylphosphonate, diethyl vinylphosphonate, diethyl phosphonoethyl acetate, methyl dimethylphosphinate, ethyl diethylphosphinate, trimethylphosphine oxide, and triethylphosphine oxide; hydrocarbon compounds such as heptane, octane, nonane, decane, and cycloheptane; and fluoroaromatic compounds such as fluorobenzene, difluorobenzene, hexafluorobenzene, and benzotrifluoride. These assistants may be used alone or in combination of two or more. Addition of these assistants leads to an improvement in capacity retention characteristics and cycle characteristics after high-temperature storage.

The additional assistant may be used in any amount that does not significantly impair the effects of the present invention. The amount of the additional assistant is preferably 0.01 mass % or more and 5 mass % or less in 100 mass % of the electrolyte solution. The additional assistant in an amount within this range is likely to sufficiently exert its effects and may make it easy to avoid a decrease in battery characteristics such as high-load discharge characteristics. The amount of the additional assistant is more preferably 0.1 mass % or more, still more preferably 0.2 mass % or more, while also more preferably 3 mass % or less, still more preferably 1 mass % or less.

The electrolyte solution of the present invention includes an electrolyte salt (II).

The electrolyte salt (II) may be any electrolyte salt, and is preferably a lithium salt.

The lithium salt may be any lithium salt that is known to be usable in electrolyte solutions for batteries, and specific examples thereof include the following:

inorganic lithium salts such as $LiPF_6$, $LiBF_4$, $LiClO_4$, $LiAlF_4$, $LiSbF_6$, $LiTaF_6$, and $LiWF_7$;

lithium tungstates such as $LiWOF_5$;

lithium carboxylates such as $HCO_2Li$, $CH_3CO_2Li$, $CH_2FCO_2Li$, $CHF_2CO_2Li$, $CF_3CO_2Li$, $CF_3CH_2CO_2Li$, $CF_3CF_2CO_2Li$, $CF_3CF_2CF_2CO_2Li$, and $CF_3CF_2CF_2CF_2CO_2Li$;

lithium sulfonates such as $FSO_3Li$, $CH_3SO_3Li$, $CH_2FSO_3Li$, $CHF_2SO_3Li$, $CF_3SO_3Li$, $CF_3CF_2SO_3Li$, $CF_3CF_2CF_2SO_3Li$, and $CF_3CF_2CF_2CF_2SO_3Li$;

lithium imide salts such as $LiN(FCO)_2$, $LiN(FCO)(FSO_2)$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, and $LiN(CF_3SO_2)(C_4F_9SO_2)$;

lithium methide salts such as $LiC(FSO_2)_3$, $LiC(CF_3SO_2)_3$, and $LiC(C_2F_5SO_2)_3$;

lithium oxalatoborate salts such as lithium difluorooxalatoborate and lithium bis(oxalato)borate;

lithium oxalatophosphate salts such as lithium tetrafluorooxalatophosphate, lithium difluorobis(oxalato)phosphate, and lithium tris(oxalato)phosphate; and fluoroorganic lithium salts such as $LiPF_4(CF_3)_2$, $LiPF_4(C_2F_5)_2$, $LiPF_4(CF_3SO_2)_2$, $LiPF_4(C_2F_5SO_2)_2$, $LiBF_3CF_3$, $LiBF_3C_2F_5$, $LiBF_3C_3F_7$, $LiBF_2(CF_3)_2$, $LiBF_2(C_2F_5)_2$, $LiBF_2(CF_3SO_2)_2$, and $LiBF_2(C_2F_5SO_2)_2$.

For an effect of improving the properties such as output characteristics, high-rate charge and discharge characteristics, high-temperature storage characteristics, and cycle characteristics, particularly preferred are $LiPF_6$, $LiBF_4$, $LiSbF_6$, $LiTaF_6$, $FSO_3Li$, $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, and $LiPF_3(C_2F_5)_3$.

These lithium salts may be used alone or may be used in combination of two or more. In the case of combination use of two or more lithium salts, preferred is a combination of $LiPF_6$ and $LiBF_4$ or a combination of $LiPF_6$ and $FSO_3Li$. Such combinations have an effect of improving the load characteristics and the cycle characteristics.

With respect to the amount of $LiBF_4$ or $FSO_3Li$ in such a case, $LiBF_4$ or $FSO_3Li$ may be used at any concentration in 100 mass % of the whole electrolyte solution as long as the effects of the present invention are not significantly impaired. The concentration thereof in the electrolyte solution of the present invention is usually 0.01 mass % or more, preferably 0.1 mass % or more. The concentration thereof is also usually 30 mass % or less, preferably 20 mass % or less.

Another example of the combination is a combination of an inorganic lithium salt and an organic lithium salt, and such combination use has an effect of suppressing the deterioration during high-temperature storage. Preferred examples of the organic lithium salt include $CF_3SO_3Li$, $LiN(FSO_2)_2$, $LiN(FSO_2)(CF_3SO_2)$, $LiN(CF_3SO_2)_2$, $LiN(C_2F_5SO_2)_2$, lithium cyclic 1,2-perfluoroethane disulfonyl imide, lithium cyclic 1,3-perfluoropropane disulfonyl imide, $LiC(FSO_2)_3$, $LiC(CF_3SO_2)_3$, $LiC(C_2F_5SO_2)_3$, lithium bisoxalatoborate, lithium difluorooxalatoborate, lithium tetrafluorooxalatophosphate, lithium difluorobisoxalatophosphate, $LiBF_3CF_3$, $LiBF_3C_2F_5$, $LiPF_3(CF_3)_3$, and $LiPF_3(C_2F_5)_3$. In such a case, the proportion of the organic lithium salt in 100 mass % of the whole electrolyte solution is preferably 0.1 mass % or more, particularly preferably 0.5 mass % or more, while also preferably 30 mass % or less, particularly preferably 20 mass % or less.

These lithium salts may be used at any concentration in the electrolyte solution as long as they do not impair the effects of the present invention. In order to make the electric conductivity of the electrolyte solution within a favorable range and to secure good battery performance, the total molar concentration of lithium in the electrolyte solution is preferably 0.3 mol/L or more, more preferably 0.4 mol/L or more, still more preferably 0.5 mol/L or more, while also preferably 3 mol/L or less, more preferably 2.5 mol/L or less, still more preferably 2.0 mol/L or less.

Too low a total molar concentration of lithium may lead to an insufficient electric conductivity of the electrolyte solution. Too high a concentration thereof may lead to a decrease in electric conductivity due to an increase in viscosity, likely resulting in poor battery performance.

The electrolyte solution of the present invention may be prepared by any known method, for example, by dissolving the aforementioned compound represented by the formula (1) and electrolyte salt (II) in the non-aqueous solvent (I).

Since the electrolyte solution of the present invention suppresses generation of gas and has stable battery characteristics, this electrolyte solution is suitable as an electrolyte solution for electrochemical devices that are non-aqueous electrolyte batteries.

One preferred embodiment of the electrolyte solution is an electrolyte solution including: a non-aqueous solvent (I) that contains as fluorinated carbonates one or both of a fluorinated cyclic carbonate and a fluorinated acyclic carbonate, a fluorine-free cyclic carbonate, and a non-fluorinated acyclic carbonate; an electrolyte salt (II); and a compound (III) represented by the formula (1). The electrolyte solution preferably contains a fluorinated cyclic carbonate as a fluorinated carbonate. The electrolyte solution preferably contains 0.01 to 12 mass %, more preferably 0.01 to 10 mass %, of the compound (III). In the electrolyte solution, the volume ratio of fluorinated carbonate/fluorine-free cyclic carbonate/non-fluorinated acyclic carbonate is preferably 7 to 35/30 to 75/0.1 to 30, more preferably 15 to 35/50 to 75/0.1 to 15, still more preferably 20 to 35/60 to 75/0.1 to 5. The electrolyte solution preferably contains 0.01 to 5 mass %, more preferably 0.1 to 3 mass % of an unsaturated cyclic carbonate such as vinylene carbonate. The aforementioned preferred types and amounts of the components may be applied to the types and amounts of the respective components in this preferred embodiment.

An electrochemical device including the electrolyte solution of the present invention is also one aspect of the present invention.

Examples of the electrochemical device include lithium ion secondary batteries, capacitors (electrolytic double-layer capacitors), radical batteries, solar cells (in particular, dye-sensitized solar cells), fuel cells, various electrochemical sensors, electrochromic elements, electrochemical switching elements, aluminum electrolytic capacitors, and tantalum electrolytic capacitors. Preferred are lithium ion secondary batteries and electrolytic double-layer capacitors, and particularly preferred are lithium ion secondary batteries.

A lithium ion secondary battery including the electrolyte solution of the present invention is also one aspect of the present invention.

The following will describe the electrochemical device containing the electrolyte solution of the present invention.

The electrochemical device may have a known configuration, and typically includes a negative electrode and a positive electrode that can occlude and release ions (e.g., lithium ions), and the aforementioned electrolyte solution of the present invention.

<Negative Electrode>

First, a negative electrode active material used for the negative electrode is described. The negative electrode active material may be any material that can electrochemically occlude and release lithium ions. Specific examples thereof include carbonaceous materials, alloyed materials, and lithium-containing metal complex oxide materials. These may be used alone or may be used in any combination of two or more.

(Negative Electrode Active Material)

Examples of the negative electrode active material include carbonaceous materials, alloyed materials, and lithium-containing metal complex oxide materials.

In order to achieve a good balance between the initial irreversible capacity and the high-current-density charge and discharge characteristics, the carbonaceous materials to be used as negative electrode active materials are preferably selected from:

(1) natural graphite;

(2) carbonaceous materials obtained by one or more heat treatments at 400° C. to 3200° C. on artificial carbonaceous substances or artificial graphite substances;

(3) carbonaceous materials in which the negative electrode active material layer includes at least two or more carbonaceous matters having different crystallinities and/or has an interface between the carbonaceous matters having different crystallinities; and (4) carbonaceous materials in which the negative electrode active material layer includes at least two or more carbonaceous matters having different orientations and/or has an interface between the carbonaceous matters having different orientations. The carbonaceous materials (1) to (4) may be used alone or in any combination of two or more at any ratio.

Examples of the artificial carbonaceous substances and the artificial graphite substances of the above carbonaceous materials (2) include coal-based coke, petroleum-based coke, coal-based pitch, petroleum-based pitch, and those prepared by oxidizing these pitches; needle coke, pitch coke, and carbon materials prepared by partially graphitizing these cokes; pyrolysates of organic matter such as furnace black, acetylene black, and pitch-based carbon fibers; carbonizable organic matter and carbides thereof; and solutions prepared by dissolving carbonizable organic matter in a low-molecular-weight organic solvent such as benzene, toluene, xylene, quinoline, or n-hexane, and carbides thereof.

The alloyed materials to be used as negative electrode active materials may be any material that can occlude and release lithium, and examples thereof include simple lithium, simple metals and alloys that constitute lithium alloys, and compounds based thereon, such as oxides, carbides, nitrides, silicides, sulfides, and phosphides thereof. The simple metals and alloys constituting lithium alloys are preferably materials containing any of metal or semi-metal elements (i.e., excluding carbon) in the Groups 13 and 14, more preferably simple metal of aluminum, silicon, and tin (hereinafter, also referred to as "specific metal elements"), and alloys or compounds containing any of these atoms. These materials may be used alone or in combination of two or more at any ratio.

Examples of the negative electrode active material having at least one atom selected from the specific metal elements include simple metal of any one specific metal element, alloys of two or more specific metal elements, alloys of one or two or more specific metal elements and one or two or more other metal elements, compounds containing one or two or more specific metal elements, and composite compounds such as oxides, carbides, nitrides, silicides, sulfides, and phosphides of these compounds. Use of such a simple metal, alloy, or metal compound as the negative electrode active material can give a high capacity to batteries.

Examples thereof further include compounds in which any of the above composite compounds are complexly bonded with several elements such as simple metals, alloys, and non-metal elements. Specifically, in the case of silicon or tin, for example, an alloy of this element and a metal that does not serve as a negative electrode may be used. In the case of tin, for example, a composite compound including a combination of five or six elements, including tin, a metal (excluding silicon) that serves as a negative electrode, a metal that does not serve as a negative electrode, and a non-metal element, may be used.

Preferred among these negative electrode active materials are simple metal of any one specific metal element, an alloy of any two or more specific metal elements, and an oxide, carbide, or nitride of a specific metal element, because such materials lead to a high capacity per unit mass when formed into batteries. For a good capacity per unit mass and small environmental load, simple metal, an alloy, oxide, carbide, or nitride of silicon and/or tin is particularly preferred.

The lithium-containing metal complex oxide materials to be used as negative electrode active materials may be any material that can occlude and release lithium. In order to achieve good high-current-density charge and discharge characteristics, materials containing titanium and lithium are preferred, lithium-containing metal complex oxide materials containing titanium are more preferred, and complex oxides of lithium and titanium (hereinafter, also abbreviated as "lithium titanium complex oxides") are still more preferred. In other words, use of a spinel-structured lithium titanium complex oxide contained in the negative electrode active material for electrochemical devices is particularly preferred because such a compound markedly reduces the output resistance.

Also preferred are lithium titanium complex oxides in which the lithium and/or titanium therein are/is replaced by any other metal element such as at least one element selected from the group consisting of Na, K, Co, Al, Fe, Ti, Mg, Cr, Ga, Cu, Zn, and Nb.

For stable structure in doping and dedoping lithium ions, the metal oxide is preferably a lithium titanium complex oxide represented by the following formula (C) wherein $0.7 \leq x \leq 1.5$, $1.5 \leq y \leq 2.3$, $0 \leq z \leq 1.6$.

$$Li_xTi_yM_zO_4 \quad (C)$$

In the formula (A), M represents at least one element selected from the group consisting of Na, K, Co, Al, Fe, Ti, Mg, Cr, Ga, Cu, Zn, and Nb.

In order to achieve a good balance of the battery performance, particularly preferred compositions represented by the formula (C) are those satisfying one of the following:

(a) $1.2 \leq x \leq 1.4$, $1.5 \leq y \leq 1.7$, $z=0$ (b) $0.9 \leq x \leq 1.1$, $1.9 \leq y \leq 2.1$, $z=0$ (c) $0.7 \leq x \leq 0.9$, $2.1 \leq y \leq 2.3$, $z=0$.

Particularly preferred representative compositions of the compound are $Li_{4/3}Ti_{5/3}O_4$, corresponding to the composition (a), $Li_1Ti_2O_4$, corresponding to the composition (b), and $Li_{4/5}Ti_{11/5}O_4$, corresponding to the composition (c).

Preferred examples of the structure satisfying $Z \neq 0$ include $Li_{4/3}Ti_{4/3}Al_{1/3}O_4$.

<Configuration and Production Method of Negative Electrode>

The electrode can be produced by any known method that does not significantly impair the effects of the present invention. For example, the negative electrode may be produced by mixing a negative electrode active material with a binder (binding agent) and a solvent, and if necessary, a thickening agent, a conductive material, filler, and other components, to form slurry; applying this slurry to a current collector; drying the slurry; and pressing the workpiece.

In the case of an alloyed material, one example of the production method is a method in which a thin film layer (negative electrode active material layer) containing the above negative electrode active material is produced by vapor deposition, sputtering, plating, or the like technique.

(Binding Agent)

The binder for binding the negative electrode active material may be any material that is stable against the electrolyte solution or a solvent to be used in production of the electrode.

Specific examples thereof include resin polymers such as polyethylene, polypropylene, polyethylene terephthalate, polymethyl methacrylate, aromatic polyamide, polyimide, cellulose, and nitro cellulose; rubbery polymers such as styrene/butadiene rubber (SBR), isoprene rubber, polybutadiene rubber, fluororubber, acrylonitrile/butadiene rubber (NBR), and ethylene/propylene rubber; styrene/butadiene/styrene block copolymers and hydrogenated products thereof; thermoplastic elastomeric polymers such as ethylene/propylene/diene terpolymers (EPDM), styrene/ethylene/butadiene/styrene copolymers, styrene/isoprene/styrene block copolymers, and hydrogenated products thereof; soft resin polymers such as syndiotactic-1,2-polybutadiene, polyvinyl acetate, ethylene/vinyl acetate copolymers, and propylene/α-olefin copolymers; fluoropolymers such as polyvinylidene fluoride, polytetrafluoroethylene, fluorinated polyvinylidene fluoride, and polytetrafluoroethylene/ethylene copolymers; and polymer compositions having an ion conductivity of alkali metal ions (especially, lithium ions). These agents may be used alone or in any combination of two or more at any ratio.

The proportion of the binder relative to the negative electrode active material is preferably 0.1 mass % or more, more preferably 0.5 mass % or more, particularly preferably 0.6 mass % or more, while also preferably 20 mass % or less, more preferably 15 mass % or less, still more preferably 10 mass % or less, particularly preferably 8 mass % or less. If the proportion of the binder relative to the negative electrode active material exceeds the above range, a large proportion of the binder may fail to contribute to the battery capacity, so that the battery capacity may decrease. If the proportion thereof is lower than the above range, the resulting negative electrode may have a lowered strength.

In particular, in the case of using a rubbery polymer typified by SBR as a main component, the proportion of the binder relative to the negative electrode active material is usually 0.1 mass % or more, preferably 0.5 mass % or more, more preferably 0.6 mass % or more, while usually 5 mass % or less, preferably 3 mass % or less, more preferably 2 mass % or less. In the case of using a fluoropolymer typified by polyvinylidene fluoride as a main component, the proportion of the binder relative to the negative electrode active material is usually 1 mass % or more, preferably 2 mass % or more, more preferably 3 mass % or more, while usually 15 mass % or less, preferably 10 mass % or less, more preferably 8 mass % or less.

(Slurry-Forming Solvent)

A solvent for forming slurry may be any solvent that can dissolve or disperse the negative electrode active material and the binder, and a thickening agent and a conductive material that are used as necessary. The slurry-forming solvent may be either an aqueous solvent or an organic solvent.

Examples of the aqueous solvent include water and alcohols. Examples of the organic solvent include N-methylpyrrolidone (NMP), dimethyl formamide, dimethyl acetamide, methyl ethyl ketone, cyclohexanone, methyl acetate, methyl acrylate, diethyl triamine, N,N-dimethyl aminopropyl amine, tetrahydrofuran (THF), toluene, acetone, diethyl ether, dimethyl acetamide, hexamethyl phospharamide, dimethyl sulfoxide, benzene, xylene, quinoline, pyridine, methyl naphthalene, and hexane.

In the case of an aqueous solvent, preferably, the aqueous solvent is made to contain a component such as a dispersant in combination with a thickening agent, and is formed into slurry using a latex such as SBR. These solvents may be used alone or in combination of two or more at any ratio.
(Current Collector)

A current collector for holding the negative electrode active material may be any known one. Examples of the negative electrode current collector include metal materials such as aluminum, copper, nickel, stainless steel, and nickel-plated steel. For easy processing and cost efficiency, copper is particularly preferred.

If the current collector is a metal material, the current collector may be in the form of, for example, metal foil, metal cylinder, metal coil, metal plate, metal film, expanded metal, punched metal, or metal foam. Preferred is a metal film, more preferred is copper foil, and still more preferred is rolled copper foil prepared by rolling or electrolyzed copper foil prepared by electrolysis. Each of these may be used as a current collector.

The current collector usually has a thickness of 1 μm or larger, preferably 5 μm or larger, while also usually 100 μm or smaller, preferably 50 μm or smaller. Too thick a negative electrode current collector may cause an excessive decrease in capacity of the whole battery, whereas too thin a current collector may be difficult to handle.
(Ratio Between Thicknesses of Current Collector and Negative Electrode Active Material Layer)

The ratio between the thicknesses of the current collector and the negative electrode active material layer may be any value, and the value "(thickness of negative electrode active material layer on one side immediately before filling of electrolyte solution)/(thickness of current collector)" is preferably 150 or smaller, still more preferably 20 or smaller, particularly preferably 10 or smaller, while preferably 0.1 or greater, still more preferably 0.4 or greater, particularly preferably 1 or greater. If the ratio between the thicknesses of the current collector and the negative electrode active material layer exceeds the above range, the current collector may generate heat due to Joule heat during high-current-density charge and discharge. If the ratio is below the above range, the volume proportion of the current collector to the negative electrode active material is high, so that the battery capacity may be low.
<Positive Electrode>
(Positive Electrode Active Material)

A positive electrode active material used for the positive electrode is described. The positive electrode active material used in the present invention is preferably a lithium transition metal compound powder that can intercalate and release lithium ions and that satisfies one of the following three conditions:

1. a lithium transition metal compound powder having a pH of 10.8 or higher;
2. a lithium transition metal compound powder containing a compound having at least one element selected from Mo, W, Nb, Ta, and Re and a compound having a B element and/or a Bi element; and
3. a lithium transition metal compound powder having a peak within a pore radius range of not smaller than 80 nm but smaller than 800 nm.
(Lithium Transition Metal Compound)

The lithium transition metal compound is a compound having a structure that can release and intercalate Li ions, and examples thereof include sulfides, phosphate compounds, and lithium transition metal complex oxides. Examples of the sulfides include compounds having a two-dimensional lamellar structure such as $TiS_2$ and $MoS_2$ and chevrel compounds having a firm three-dimensional skeleton structure represented by $Me_xMo_6S_8$ (wherein Me is a transition metal such as Pb, Ag, or Cu). Examples of the phosphate compounds include those having an olivine structure generally represented by $LiMePO_4$ (wherein Me is at least one transition metal), and specific examples thereof include $LiFePO_4$, $LiCoPO_4$, $LiNiPO_4$, and $LiMnPO_4$. Examples of the lithium transition metal complex oxides include those having a three-dimensionally diffusible spinel structure and those having a lamellar structure that enables two-dimensional diffusion of lithium ions. Those having a spinel structure are generally represented by $LiMe_2O_4$ (wherein Me is at least one transition metal), and specific examples thereof include $LiMn_2O_4$, $LiCoMnO_4$, $LiNi_{0.5}Mn_{1.5}O_4$, and $LiCoVO_4$. Those having a lamellar structure are generally represented by $LiMeO_2$ (wherein Me is at least one transition metal), and specific examples thereof include $LiCoO_2$, $LiNiO_2$, $LiNi_{1-x}Co_xO_2$, $LiNi_{1-x-y}Co_xMn_yO_2$, $LiNi_{0.5}Mn_{0.5}O_2$, $Li_{1.2}Cr_{0.4}Mn_{0.4}O_2$, $Li_{1.2}Cr_{0.4}Ti_{0.4}O_2$, and $LiMnO_2$.

Particularly preferred is a lithium nickel manganese cobalt complex oxide or $LiCoO_2$.

For good diffusion of lithium ions, the lithium transition metal compound powder preferably has an olivine structure, a spinel structure, or a lamellar structure. Particularly preferred is one having a lamellar structure.

The lithium transition metal compound powder may include other elements. Such other elements include one or more selected from B, Na, Mg, Al, K, Ca, Ti, V, Cr, Fe, Cu, Zn, Sr, Y, Zr, Nb, Ru, Rh, Pd, Ag, In, Sb, Te, Ba, Ta, Mo, W, Re, Os, Ir, Pt, Au, Pb, La, Ce, Pr, Nd, Sm, Eu, Gd, Tb, Dy, Ho, Er, Tm, Yb, Lu, Bi, N, F, S, Cl, Br, and I. These other elements may be introduced into the crystal structure of the lithium nickel manganese cobalt complex oxide, or may not be introduced into the crystal structure of the lithium nickel manganese cobalt complex oxide but be unevenly distributed as simple substances or compounds on surfaces or grain boundaries of the particles.
(Additives)

In the present invention, a compound (hereinafter, also referred to as an "additive 1") having at least one or more elements selected from Mo, W, Nb, Ta, and Re (hereinafter, also referred to as "additive elements 1") and a compound (hereinafter, also referred to as an "additive 2") having at least one elements selected from B and Bi (hereinafter, also referred to as additive elements 2") may be used.

In order to achieve a large effect, Mo or W is preferred, and W is most preferred, among these additive elements 1. Further, B is preferred among these additive elements 2 because B is inexpensively available as an industrial material and is a light element.

The compound (additive 1) having an additive element 1 may be of any type that leads to the effects of the present invention, and is usually an oxide.

Examples of the additive 1 include MoO, $MoO_2$, $MoO_3$, $MoO_x$, $Mo_2O_3$, $Mo_2O_5$, $Li_2MoO_4$, WO, $WO_2$, $WO_3$, $WO_x$, $W_2O_3$, $W_2O_5$, $W_{18}O_{49}$, $W_{20}O_{58}$, $W_{24}O_{70}$, $W_{25}O_{73}$, $W_{40}O_{118}$, $Li_2WO_4$, NbO, $NbO_2$, $Nb_2O_3$, $Nb_2O_5$, $Nb_2O_5 \cdot nH_2O$, $LiNbO_3$, $Ta_2O$, $Ta_2O_5$, $LiTaO_3$, $ReO_2$, $ReO_3$, $Re_2O_3$, and $Re_2O_7$. Preferred are $MoO_3$, $Li_2MoO_4$, $WO_3$, and $Li_2WO_4$, and particularly preferred is $WO_3$, because they are relatively easily available as industrial materials or they contain lithium. These additives 1 may be used alone or may be used in combination of two or more.

The compound (additive 2) having an additive element 2 may be of any type that leads to the effects of the present invention, and is usually boric acid, a salt with oxoacid, an oxide, or a hydroxide. Preferred among these additives 2 are boric acid and oxides, and particularly preferred is boric acid, because they are inexpensively available as industrial materials.

Examples of the additive 2 include BO, $B_2O_2$, $B_2O_3$, $B_4O_5$, $B_6O$, $B_7O$, $B_{13}O_2$, $LiBO_2$, $LiB_5O_8$, $Li_2B_4O_7$, $HBO_2$, $H_3BO_3$, $B(OH)_3$, $B(OH)_4$, $BiBO_3$, $Bi_2O_3$, $Bi_2O_5$, and $Bi(OH)_3$. Preferred are $B_2O_3$, $H_3BO_3$, and $Bi_2O_3$, and particularly preferred is $H_3BO_3$, because they are relatively inexpensively and easily available as industrial materials. These additives 2 may be used alone or may be used in combination of two or more.

With respect to the sum of the amounts of the additive 1 and the additive 2 relative to the total molar amount of the transition metal elements constituting the main components, the lower limit thereof is usually 0.1 mol % or more, preferably 0.3 mol % or more, more preferably 0.5 mol % or more, particularly preferably 1.0 mol % or more, whereas the upper limit thereof is usually less than 8 mol %, preferably 5 mol % or less, more preferably 4 mol % or less, particularly preferably 3 mol % or less. If the sum of the amounts thereof is below the lower limit, the effects of the additives may not be possibly achieved. If the sum of the amounts thereof exceeds the upper limit, the battery performance may possibly be impaired.

(Production Method of Positive Electrode Active Material)

The positive electrode active material can be produced by any usual method of producing inorganic compounds. In particular, various methods may be mentioned for producing a spherical or ellipsoidal active material. For example, a material substance of transition metal is dissolved or pulverized and dispersed in a solvent such as water, and the pH of the solution or dispersion is adjusted under stirring to form a spherical precursor. The precursor is recovered and, if necessary, dried. Then, a Li source such as LiOH, $Li_2CO_3$, or $LiNO_3$ is added thereto and the mixture is sintered at high temperature, thereby providing an active material.

In order to produce a positive electrode, the aforementioned positive electrode active materials may be used alone or in any combination of one or more having different compositions at any ratio. Preferred examples of the combination in this case include a combination of $LiCoO_2$ and $LiMn_2O_4$ in which part of Mn may optionally be replaced by different transition metal(s) (e.g., $LiNi_{0.33}Co_{0.33}Mn_{0.33}O_2$), and a combination of $LiCoO_2$ in which part of Co may optionally be replaced by different transition metal(s).

(Production Method of Lithium Transition Metal Compound Powder)

The lithium transition metal compound powder may be produced by any method, and may be suitably produced by a production method including: pulverizing and uniformly dispersing a lithium compound, at least one transition metal compound selected from Mn, Co, and Ni, and the aforementioned additive(s) in a liquid medium to provide slurry; spray-drying the resulting slurry; and sintering the resulting spray-dried matter.

For example, in the case of a lithium nickel manganese cobalt complex oxide powder, such a powder can be produced by dispersing a lithium compound, a nickel compound, a manganese compound, a cobalt compound, and the aforementioned additive(s) in a liquid medium to provide slurry, spray-drying the slurry, and sintering the resulting spray-dried matter in an oxygen-containing gas atmosphere.

The following will specifically describe the method of producing a lithium transition metal compound powder used in the present invention by taking, as an example, a production method for a lithium nickel manganese cobalt complex oxide powder that is one preferred embodiment of the present invention.

I) Slurry Preparation Step

In production of the lithium transition metal compound powder, examples of the lithium compound among the material compounds used in the slurry preparation include $Li_2CO_3$, $LiNO_3$, $LiNO_2$, LiOH, $LiOH.H_2O$, LiH, LiF, LiCl, LiBr, LiI, $CH_3OOLi$, $Li_2O$, $Li_2SO_4$, Li dicarboxylate, Li citrate, fatty acid Li, and alkyllithiums. Preferred among these lithium compounds are lithium compounds free from a nitrogen atom, a sulfur atom, and a halogen atom because they do not generate hazardous materials such as $SO_x$ and $NO_x$ in the sintering step, and compounds that are likely to form voids in the secondary particles of the spray-dried powder by, for example, generating decomposed gas during sintering. In consideration of these points, $Li_2CO_3$, LiOH, and $LiOH.H_2O$ are preferred, and $Li_2CO_3$ is particularly preferred. These lithium compounds may be used alone or may be used in combination of two or more.

Examples of the nickel compound include $Ni(OH)_2$, NiO, NiOOH, $NiCO_3$, $2NiCO_3.3Ni(OH)_2.4H_2O$, $NiC_2O_4.2H_2O$, $Ni(NO_3)_2.6H_2O$, $NiSO_4$, $NiSO_4.6H_2O$, fatty acid nickel, and nickel halides. Preferred are nickel compounds such as $Ni(OH)_2$, NiO, NiOOH, $NiCO_3$, $2NiCCO_3.3Ni(OH)_2.4H_2O$, and $NiC_2O_4.2H_2O$ because they do not generate hazardous materials such as $SO_x$ and $NO_x$ in the sintering step. Particularly preferred are $Ni(OH)_2$, NiO, NiOOH, and $NiCO_3$ because they are inexpensively available as industrial materials and have high reactivity, and also particularly preferred are $Ni(OH)_2$, NiOOH, and $NiCO_3$ because they are likely to form voids in the secondary particles of the spray-dried powder by, for example, generating decomposed gas during sintering. These nickel compounds may be used alone or may be used in combination of two or more.

Examples of the manganese compound include manganese oxides such as $Mn_2O_3$, $MnO_2$, and $Mn_3O_4$, manganese salts such as $MnCO_3$, $Mn(NO_3)_2$, $MnSO_4$, manganese acetate, manganese dicarboxylates, manganese citrate, and fatty acid manganese, oxyhydroxides, and halides such as manganese chloride. Preferred among these manganese compounds are $MnO_2$, $Mn_2O_3$, $Mn_3O_4$, and $MnCO_3$ because they do not generate gas such as $SO_x$ and $NO_x$ in the sintering step and are inexpensively available as industrial materials. These manganese compounds may be used alone or may be used in combination of two or more.

Examples of the cobalt compound include $Co(OH)_2$, CoOOH, CoO, $Co_2O_3$, $Co_3O_4$, $Co(OCOCH_3)_2.4H_2O$, $CoCl_2$, $Co(NO_3)_2.6H_2O$, and $Co(SO_4)_2.7H_2O$, and $CoCO_3$. Preferred among these are $Co(OH)_2$, CoOOH, CoO, $Co_2O_3$, $Co_3O_4$, and $CoCO_3$ because they do not generate hazardous materials such as $SO_x$ and $NO_x$ in the sintering step. Still more preferred are $Co(OH)_2$ and CoOOH because they are industrially inexpensively available and have high reactivity. In addition, particularly preferred are $Co(OH)_2$, CoOOH, and $CoCO_3$ because they are likely to form voids in the secondary particles of the spray-dried powder by, for example, generating decomposed gas during sintering. These cobalt compounds may be used alone or may be used in combination of two or more.

In addition to the above Li, Ni, Mn, and Co material compounds, the aforementioned other elements may be introduced by element replacement, or any compound group may be used for the purpose of efficiently forming voids in the secondary particles formed by spray-drying to be mentioned later. The compound to be used for efficiently forming voids in the secondary particles may be added at any stage, and may be added before or after the mixing of the materials in accordance with the properties thereof. In particular, a compound that is likely to be decomposed in the mixing step due to mechanical shearing force is preferably added after the mixing step. The additive(s) to be possibly used in the present invention are as mentioned above.

The materials may be mixed by any method, including wet methods and dry methods. Examples thereof include methods using any device such as a ball mill, a vibrating mill, or a bead mill. Wet mixing in which the material compounds are mixed in a liquid medium such as water or alcohol is preferred because the materials are more uniformly mixed and the reactivity of the mixture in the sintering step is improved.

The mixing time may vary in accordance with the mixing method and may be any period of time as long as the materials are uniformly mixed in the order of the particle level. For example, the mixing time is usually about one hour to two days in the case of using a ball mill (wet or dry method), and the residence time is usually about 0.1 hours to 6 hours in the case of using a bead mill (continual wet method).

In the stage of mixing the materials, the materials are preferably simultaneously pulverized. The degree of pulverization is indicated by the particle size of the pulverized particles of the materials, and the average particle size (median size) is usually 0.6 µm or smaller, preferably 0.55 µm or smaller, still more preferably 0.52 µm or smaller, most preferably 0.5 µm or smaller. Too large an average particle size of the pulverized particles of the materials may lead to low reactivity in the sintering step and difficulty in making the composition uniform. In contrast, pulverizing the materials into excessively small particles may cost high. Thus, the materials have only to be pulverized into particles usually having an average particle size of 0.01 µm or greater, preferably 0.02 µm or greater, still more preferably 0.05 µm or greater. Such a degree of pulverization may be achieved by any means, and wet pulverization is preferred. One specific example thereof is dyno-mill.

The median size of the pulverized particles in the slurry is determined with a known laser diffraction/scattering particle size distribution analyzer at a refractive index of 1.24, the particle size being based on volume. The dispersion medium used in the measurement is a 0.1 wt % sodium hexametaphosphate aqueous solution, and the measurement was performed after a five-minute ultrasonic dispersion (output: 30 W, frequency: 22.5 kHz).

II) Spray-Drying Step

The wet mixing is usually followed by a drying step. The drying may be performed by any method. In order to achieve good uniformity of generated particulates, powder flowability, and powder handleability, and to efficiently produce dried particles, spray drying is preferred.

(Spray-Dried Powder)

In the method of producing a lithium transition metal compound powder such as the above lithium nickel manganese cobalt complex oxide powder, the slurry obtained by wet-pulverizing the material compounds and the aforementioned additive(s) is spray-dried, so that the primary particles coagulate to form secondary particles, resulting in the target powder. The geometric features of the spray-dried powder formed by coagulation of the primary particles into the secondary particles may be analyzed by, for example, SEM observation or cross-sectional SEM observation.

III) Sintering Step

The spray-dried powder obtained in the above spray-drying step is then subjected to a sintering treatment as a sintering precursor.

The sintering conditions depend on the composition and the lithium compound material used. Still, too high a sintering temperature tends to cause excessive growth of the primary particles, excessive sintering of the particles, and too small a specific surface area of the particles. In contrast, too low a sintering temperature tends to cause mixing of hetero-phases and non-growth of the crystal structure, resulting in an increase in lattice strain. Further, the specific surface area tends to be too large. The sintering temperature is usually 1000° C. or higher, preferably 1010° C. or higher, more preferably 1025° C. or higher, still more preferably 1050° C. or higher, while usually 1250° C. or lower, preferably 1200° C. or lower, more preferably 1175° C. or lower.

The sintering may be performed in, for example, a box furnace, a tube furnace, a tunnel furnace, or a rotary kiln. The sintering step is usually divided into three sections, i.e., a temperature-increasing section, a maximum-temperature-keeping section, and a temperature-decreasing section. The second section of maximum-temperature keeping is not necessarily performed only once, and may be performed twice or more in accordance with the purpose. The step consisting of the temperature-increasing section, the maximum-temperature-keeping section, and the temperature-decreasing section may be repeated twice or more times while a separating step in which the coagulated secondary particles are separated without destruction of the particles, or a pulverizing step in which the coagulated secondary particles are pulverized into the primary particles or much smaller particles is performed between the respective sintering steps.

In the case of two-stage sintering, the temperature in the first stage is preferably kept at a temperature of not lower than the temperature where the Li material starts to decompose but not higher than the temperature where the Li material melts. For example, in the case of using lithium carbonate, the temperature kept in the first stage is preferably 400° C. or higher, more preferably 450° C. or higher, still more preferably 500° C. or higher, most preferably 550° C. or higher, while usually 950° C. or lower, more preferably 900° C. or lower, still more preferably 880° C. or lower, most preferably 850° C. or lower.

In the temperature-increasing section that leads to the maximum-temperature-keeping section, the temperature inside the furnace is usually increased at a temperature-increasing rate of 1° C./min or higher and 15° C./min or lower. Too low a temperature-increasing rate is industrially disadvantageous because the section takes too long a time, but too high a temperature-increasing rate is also not preferred because the temperature inside the furnace fails to follow the set temperature in some furnaces. The temperature-increasing rate is preferably 2° C./min or higher, more preferably 3° C./min or higher, while preferably 20° C./min or lower, more preferably 18° C./min or lower.

The temperature-keeping time in the maximum-temperature-keeping section varies in accordance with the set temperature. If the temperature is within the above range, the temperature-keeping time is usually 15 minutes or longer, preferably 30 minutes or longer, still more preferably 45 minutes or longer, most preferably 1 hour or longer, while usually 24 hours or shorter, preferably 12 hours or shorter, still more preferably 9 hours or shorter, most preferably 6 hours or shorter. Too short a sintering time may fail to provide a lithium transition metal compound powder with good crystallinity. Too long a sintering time is not practical.

Too long a sintering time disadvantageously requires post-separation or makes it difficult to perform such post-separation.

In the temperature-decreasing section, the temperature inside the furnace is usually decreased at a temperature-decreasing rate of 0.1° C./min or higher and 15° C./min or lower. Too low a temperature-decreasing rate is industrially disadvantageous because the section takes too long a time, but too high a temperature-decreasing rate tends to cause insufficient uniformity of the target matter or rapid deterioration of the container. The temperature-decreasing rate is preferably 1° C./min or higher, more preferably 3° C./min or higher, while preferably 20° C./min or lower, more preferably 15° C./min or lower.

An appropriate oxygen partial pressure region varies in accordance with the target composition of a lithium transition metal compound powder. Thus, the sintering atmosphere is any appropriate gas atmosphere satisfying the appropriate oxygen partial pressure region. Examples of the atmospheric gas include oxygen, the air, nitrogen, argon, hydrogen, carbon dioxide, and mixtures of any of these gases. For the lithium nickel manganese cobalt complex oxide powder, an oxygen-containing gas atmosphere, such as the air, may be used. The oxygen concentration in the atmosphere is usually 1 vol % or more, preferably 10 vol % or more, more preferably 15 vol % or more, while usually 100 vol % or less, preferably 50 vol % or less, more preferably 25 vol % or less.

In production of a lithium transition metal compound powder, such as a lithium nickel manganese cobalt complex oxide powder having the above specific composition, by the aforementioned production method under constant production conditions, the mole ratio of Li/Ni/Mn/Co in the target powder can be controlled by adjusting the ratio of mixing the compounds in preparation of slurry containing a lithium compound, a nickel compound, a manganese compound, and a cobalt compound, and an additive(s) dispersed in a liquid medium.

The lithium transition metal compound powder, such as a lithium nickel manganese cobalt complex oxide powder, thus obtained can provide a positive electrode material for lithium secondary batteries having well-balanced performance, i.e., having a high capacity and excellent low-temperature output characteristics and storage characteristics.

<Configuration and Production Method of Positive Electrode>

The following gives the configuration of the positive electrode. The positive electrode may be produced by forming a positive electrode active material layer containing a positive electrode active material and a binding agent on a current collector. The production of a positive electrode with a positive electrode active material may be performed by a usual method. Specifically, a positive electrode active material and a binding agent, and if necessary, other components such as a conductive material and a thickening agent are dry-mixed to provide a sheet, and then this sheet is press-bonded to a positive electrode current collector, or these materials are dissolved or dispersed in a liquid medium to provide slurry, and then this slurry is applied to a positive electrode current collector and dried, so that a positive electrode active material layer is formed on the current collector. Thereby, a positive electrode is obtained.

The amount of the positive electrode active material in the positive electrode active material layer is preferably 80 mass % or more, more preferably 82 mass % or more, particularly preferably 84 mass % or more. The upper limit thereof is preferably 99 mass % or less, more preferably 98 mass % or less. Too small an amount of the positive electrode active material in the positive electrode active material layer may lead to an insufficient electric capacity. In contrast, too large an amount thereof may lead to an insufficient strength of the positive electrode.

(Binding Agent)

The binding agent used in production of the positive electrode active material layer may be any binding agent. In the case of the applying technique, the binding agent has only to be a material that is to be dissolved or dispersed in a liquid medium used in production of the electrode. Specific examples thereof include the same binding agents as those to be used in the above production of the negative electrode. These materials may be used alone or in any combination of two or more at any ratio.

The proportion of the binding agent in the positive electrode active material layer is usually 0.1 mass % or more, preferably 1 mass % or more, more preferably 1.5 mass % or more. The upper limit thereof is usually 80 mass % or less, preferably 60 mass % or less, still more preferably 40 mass % or less, most preferably 10 mass % or less. Too low a proportion of the binding agent may fail to sufficiently hold the positive electrode active material, so that the resulting positive electrode may have an insufficient mechanical strength, resulting in poor battery performance such as cycle characteristics. In contrast, too high a proportion thereof may lead to a decrease in battery capacity and conductivity.

(Slurry-Forming Solvent)

A solvent for forming slurry may be any solvent that can dissolve or disperse the positive electrode active material, the conductive material, and the binding agent, and a thickening agent that is used as necessary. The slurry-forming solvent may be either an aqueous solvent or an organic solvent. Examples of the aqueous medium include water and solvent mixtures of an alcohol and water. Examples of the organic medium include aliphatic hydrocarbons such as hexane; aromatic hydrocarbons such as benzene, toluene, xylene, and methyl naphthalene; heterocyclic compounds such as quinoline and pyridine; ketones such as acetone, methyl ethyl ketone, and cyclohexanone; esters such as methyl acetate and methyl acrylate; amines such as diethylene triamine and N,N-dimethylaminopropylamine; ethers such as diethyl ether, propylene oxide, and tetrahydrofuran (THF); amides such as N-methylpyrrolidone (NMP), dimethyl formamide, and dimethyl acetamide; and aprotic polar solvents such as hexamethyl phospharamide and dimethyl sulfoxide.

(Current Collector)

A positive electrode current collector may be formed from any material, and any known material can be used. Specific examples thereof include metal materials such as aluminum, stainless steel, nickel-plated metals, titanium, and tantalum; and carbon materials such as carbon cloth and carbon paper. Preferred is any metal material, in particular aluminum.

In the case of a metal material, the current collector may be in the form of, for example, metal foil, metal cylinder, metal coil, metal plate, metal film, expanded metal, punched metal, or metal foam. In the case of a carbon material, the current collector may be in the form of, for example, carbon plate, carbon film, or carbon cylinder.

In order to decrease the electronic contact resistance between the current collector and the positive electrode active material layer, a conductive assistant may also preferably be applied to a surface of the current collector.

Examples of the conductive assistant include carbon and noble metals such as gold, platinum, and silver.

The ratio between the thicknesses of the current collector and the positive electrode active material layer may be any value, and the value "(thickness of positive electrode active material layer on one side immediately before filling of electrolyte solution)/(thickness of current collector)" is preferably 20 or smaller, more preferably 15 or smaller, most preferably 10 or smaller. The lower limit thereof is also preferably 0.5 or greater, more preferably 0.8 or greater, most preferably 1 or greater. If the ratio exceeds this range, the current collector may generate heat due to Joule heat during high-current-density charge and discharge. If the ratio is below the above range, the volume proportion of the current collector to the positive electrode active material is high, so that the battery capacity may be low.

<Separator>

In order to prevent a short circuit, a separator is usually disposed between the positive electrode and the negative electrode. In this case, the electrolyte solution of the present invention is usually impregnated into this separator.

The separator may be formed from any known material and may have any known shape as long as the effects of the present invention are not impaired. The separator is preferably formed from a material stable to the electrolyte solution of the present invention, such as resin, glass fiber, or inorganic matter, and in the form of a porous sheet or a nonwoven fabric which are excellent in a liquid-retaining ability.

Examples of the material of a resin or glass-fiber separator include polyolefins such as polyethylene and polypropylene, aromatic polyamide, polytetrafluoroethylene, polyether sulfone, and glass filters. Particularly preferred are glass filter and polyolefins, still more preferred are polyolefins. These materials may be used alone or in any combination of two or more at any ratio.

The separator may have any thickness, and the thickness is usually 1 μm or larger, preferably 5 μm or larger, more preferably 8 μm or larger, while usually 50 μm or smaller, preferably 40 μm or smaller, more preferably 30 μm or smaller. The separator thinner than the above range may have poor insulation and mechanical strength. The separator thicker than the above range may lead to not only poor battery performance, such as rate characteristics, but also a low energy density of the whole electrochemical device.

If the separator is a porous one such as a porous sheet or a nonwoven fabric, the separator may have any porosity. The porosity is usually 20% or higher, preferably 35% or higher, more preferably 45% or higher, whereas the porosity is usually 90% or lower, preferably 85% or lower, more preferably 75% or lower. The separator having a porosity of lower than the above range tends to cause a high film resistance and poor rate characteristics. The separator having a porosity of higher than the above range tends to cause a low mechanical strength and poor insulation.

The separator may also have any average pore size. The average pore size is usually 0.5 μm or smaller, preferably 0.2 μm or smaller, while usually 0.05 μm or larger. The separator having an average pore size exceeding the above range may easily cause a short circuit. The separator having an average pore size of lower than the above range may have a high film resistance and lead to poor rate characteristics.

Examples of the inorganic matter include oxides such as alumina and silicon dioxide, nitrides such as aluminum nitride and silicon nitride, and sulfates such as barium sulfate and calcium sulfate. The inorganic matter is in the form of particles or fibers.

The separator is in the form of a thin film such as a nonwoven fabric, a woven fabric, or a microporous film. The thin film favorably has a pore size of 0.01 to 1 μm and a thickness of 5 to 50 μm. Instead of the above independent thin film, the separator may have a structure in which a composite porous layer containing particles of the above inorganic matter is disposed on a surface of one or both of the positive and negative electrodes using a resin binding agent. For example, alumina particles having a 90% particle size of smaller than 1 μm are applied to both surfaces of the positive electrode with fluororesin used as a binding agent to form a porous layer.

The following will describe the battery design.

<Electrode Group>

The electrode group may be either a laminated structure including the above positive and negative electrode plates with the above separator in between, or a wound structure including the above positive and negative electrode plates in spiral with the above separator in between. The proportion of the volume of the electrode group in the battery internal volume (hereinafter, referred to as an electrode group occupancy) is usually 40% or higher, preferably 50% or higher, while usually 90% or lower, preferably 80% or lower.

The electrode group occupancy of lower than the above range may lead to a low battery capacity. The electrode group occupancy exceeding the above range may lead to small space for voids. Thus, when the battery temperature rises to high temperature, the components may expand or the liquid fraction of the electrolyte may show a high vapor pressure, so that the internal pressure may rise. As a result, the battery characteristics such as charge and discharge repeatability and the high-temperature storageability may be impaired and a gas-releasing valve for releasing the internal pressure toward the outside may work.

<Current-Collecting Structure>

The current-collecting structure may be any structure. In order to more effectively improve the high-current-density charge and discharge characteristics by the electrolyte solution of the present invention, the current-collecting structure is preferably a structure which has low resistances at wiring portions and jointing portions. With such low internal resistances, the effects of using the electrolyte solution of the present invention can particularly favorably be achieved.

In an electrode group having the layered structure, the metal core portions of the respective electrode layers are preferably bundled and welded to a terminal. If the area of a single electrode is large, the internal resistance is high. Thus, multiple terminals may preferably be formed in the electrode to decrease the resistance. In an electrode group having the wound structure, multiple lead structures may be disposed on each of the positive electrode and the negative electrode and bundled to a terminal. Thereby, the internal resistance can be decreased.

<External Case>

The external case may be made of any material that is stable to an electrolyte solution to be used. Specific examples thereof include metals such as nickel-plated steel plates, stainless steel, aluminum and aluminum alloys, and magnesium alloys, and layered film (laminate film) of resin and aluminum foil. In order to reduce the weight, a metal such as aluminum or an aluminum alloy or a laminate film is favorably used.

External cases made of metal may have a sealed up structure formed by welding the metal by laser welding, resistance welding, or ultrasonic welding or a caulking structure using the metal via a resin gasket. External cases made of a laminate film may have a sealed up structure formed by hot melting the resin layers. In order to improve the sealability, a resin which is different from the resin of the laminate film may be disposed between the resin layers. Especially, in the case of forming a sealed up structure by heat melting the resin layers via current collecting terminals, metal and resin are to be bonded. Thus, the resin to be disposed between the resin layers is favorably a resin having a polar group or a modified resin having a polar group introduced thereinto.

<Protective Element>

Any of positive temperature coefficient (PTC) thermistors the resistance of which increases in case of abnormal heating or excessive current flow, thermal fuses, thermistors, and valves (current-breaking valves) that break the current flowing in a circuit in response to a rapid increase in pressure or temperature inside the battery in case of abnormal heating may be used as a protective element. The protective element is preferably selected from elements that do not work under normal use at high currents. The battery is more preferably designed so as to cause neither abnormal heating nor thermal runaway even without a protective element.

<External Housing>

The electrochemical device of the present invention usually includes the electrolyte solution, the negative electrode, the positive electrode, the separator, and other components contained in an external housing. This external housing may be any known housing as long as the effects of the present invention are not significantly impaired. Specifically, the external housing may be formed of any material, and is usually formed of, for example, nickel-plated iron, stainless steel, aluminum or alloy thereof, nickel, or titanium.

The external housing may be in any form, and may be in the form of a cylinder, a square, a laminate, a coin, or a large size, for example.

A module including the lithium ion secondary battery of the present invention is also one aspect of the present invention.

As mentioned above, the electrolyte solution of the present invention suppresses generation of gas and is excellent in battery characteristics. Thus, the electrolyte solution is especially useful as an electrolyte solution for electrochemical devices such as large-size lithium ion secondary batteries for hybrid vehicles or distributed generation, as well as useful as an electrolyte solution for electrochemical devices such as small-size lithium ion secondary batteries.

EXAMPLES AND COMPARATIVE EXAMPLES

The present invention will be described referring to, but not limited to, examples and comparative examples.

Solvents shown in Table 1 or Table 2 were mixed at a ratio shown in Table 1 or Table 2 in a 1-L PFA bottle. A non-aqueous electrolyte salt shown in Table 1 or Table 2 was added to the solvent mixture at a weight ratio shown in Table 1 or Table 2. Thereby, an electrolyte solution was obtained. To the resulting electrolyte solution were added an acyclic sulfonate compound and other components serving as additives shown in Table 1 or Table 2 in amounts shown in Table 1 or Table 2. Thereby, an electrolyte solution of the corresponding example or comparative example was obtained.

(Production of Laminate Cell)

$LiNi_{1/3}Mn_{1/3}Co_{1/3}O_2$, carbon black, and polyvinylidene fluoride (trade name: KF-7200, Kureha Chemical Industry Co., Ltd.) were mixed at a ratio of 92/3/5 (mass ratio) to provide a positive electrode active material. This positive electrode active material was dispersed in N-methyl-2-pyrrolidone to provide a positive electrode mixture slurry. The resulting positive electrode mixture slurry was uniformly applied on an aluminum current collector, and then dried to form a positive electrode mixture layer (thickness: 50 μm). Thereafter, the layer was compression molded using a roller press. Thereby, a positive electrode laminate was produced. The positive electrode laminate was punched into a size of 5.0 mm×7.0 mm using a punching machine. Thereby, a positive electrode was produced.

Separately, styrene-butadiene rubber dispersed in distilled water was added to artificial graphite powder such that the solids content was 4 mass %. The components were mixed using a disperser to be in the form of slurry. This slurry was uniformly applied on a negative electrode current collector (copper foil having a thickness of 10 μm), and then dried to provide a negative electrode mixture layer. Thereafter, the layer was compression molded using a roller press, and the compression-molded article was punched into a size of 5.0 mm×7.0 mm using a punching machine. Thereby, a negative electrode was produced.

The positive electrode and the negative electrode were made to face each other with a 20-μm-thick microporous polyethylene film (separator) in between, and were assembled in an aluminum laminated film (Dai Nippon Printing Co., Ltd.). Then, the non-aqueous electrolyte solution prepared above was injected thereinto. As the electrolyte solution sufficiently permeated into the separator and the other components, the workpiece was sealed, precharged, and aged. Thereby, an aluminum-laminated lithium ion secondary battery was produced. Then, the amount of gas was determined.

In the gas amount determination, the battery was charged at 1.0 C and 4.35 V until the charge current reached 1/10 C. The volume of the cell was measured based on the Archimedes' principle. Then, the cell was stored in a 85° C.-constant tank for one day, and the volume of the stored cell was measured in the same manner. The difference between the volumes before and after the storage was defined as the gas amount, and was shown in Table 1 or Table 2.

The abbreviations in the tables represent the following compounds.

EC: ethylene carbonate
PC: propylene carbonate
EMC: ethyl methyl carbonate
DMC: dimethyl carbonate
DEC: diethyl carbonate
VC: vinylene carbonate The components shown in Table 1 and Table 2 were as follows.

FEC: fluoroethylene carbonate

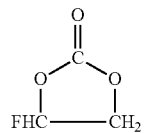
(2)

DFEC: difluoroethylene carbonate

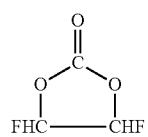
(3)

Component (i):

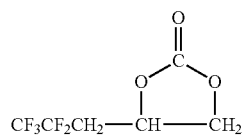
(4)

Component (ii):

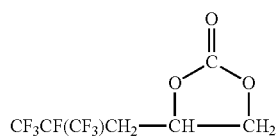
(5)

Component (a):

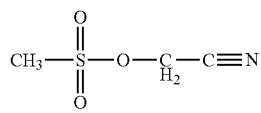
(7)

Component (b):

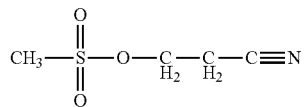
(11)

Component (c):

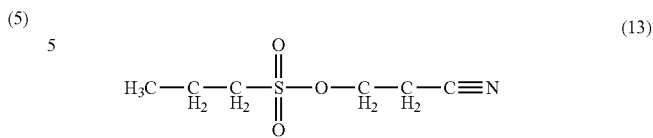
(13)

Component (d):

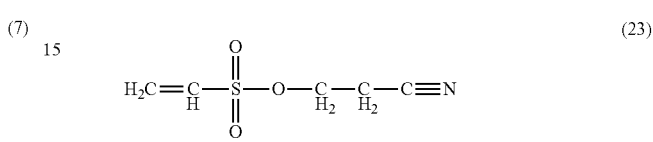
(23)

Component (e):

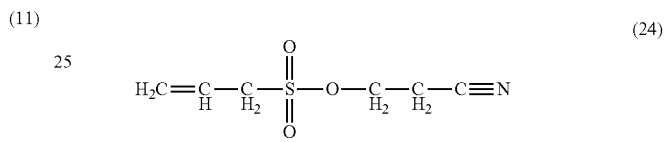
(24)

TABLE 1

|  | Non-aqueous solvent (vol %) | Fluorine-containing non-aqueous solvent (vol %) | Non-aqueous electrolyte salt (mol/l) | Compound (III) | Amount (wt %) | Additive (wt %) | Gas amount (Δvol; ml) |
|---|---|---|---|---|---|---|---|
| Example 1 | EC/EMC (20/70) | FEC (10) | LiPF6 (1) | Component (a) | 2.0 | — | 0.58 |
| Example 2 | EC/EMC (20/70) | FEC (10) | LiPF6 (1) | Component (a) | 2.0 | VC (2) | 0.68 |
| Example 3 | EC/EMC (20/70) | FEC (10) | LiPF6 (1) | Component (b) | 0.01 | VC (2) | 1.09 |
| Example 4 | EC/EMC (20/70) | FEC (10) | LiPF6 (1) | Component (b) | 0.5 | VC (2) | 1.00 |
| Example 5 | EC/EMC (20/70) | FEC (10) | LiPF6 (1) | Component (b) | 2.0 | VC (2) | 0.63 |
| Example 6 | EC/EMC (20/70) | FEC (10) | LiPF6 (1) | Component (b) | 10.0 | VC (2) | 0.76 |
| Example 7 | EC/EMC (20/70) | FEC (10) | LiPF6 (1) | Component (b) | 16.0 | VC (2) | 1.55 |
| Example 8 | EC/EMC (20/70) | FEC (10) | LiPF6 (1) | Component (c) | 2.0 | VC (2) | 0.70 |
| Example 9 | EC/EMC (20/70) | FEC (10) | LiPF6 (1) | Component (d) | 2.0 | VC (2) | 0.60 |
| Example 10 | EC/EMC (20/70) | FEC (10) | LiPF6 (1) | Component (e) | 0.02 | VC (2) | 1.02 |
| Example 11 | EC/EMC (20/70) | FEC (10) | LiPF6 (1) | Component (e) | 0.5 | VC (2) | 0.95 |
| Example 12 | EC/EMC (20/70) | FEC (10) | LiPF6 (1) | Component (e) | 2.0 | VC (2) | 0.57 |
| Example 13 | EC/EMC (20/70) | FEC (10) | LiPF6 (1) | Component (e) | 10.0 | VC (2) | 0.89 |
| Example 14 | EC/EMC (20/70) | FEC (10) | LiPF6 (1) | Component (e) | 15.0 | VC (2) | 1.72 |
| Example 15 | EC/EMC (29.5/70) | FEC (0.5) | LiPF6 (1) | Component (b) | 2.0 | VC (2) | 0.49 |
| Example 16 | EC/EMC (17/58) | FEC (25) | LiPF6 (1) | Component (b) | 2.0 | VC (2) | 3.45 |
| Example 17 | EC/EMC (9/31) | FEC (60) | LiPF6 (1) | Component (b) | 2.0 | VC (2) | 7.90 |
| Example 18 | EC/EMC (20/70) | DFEC (10) | LiPF6 (1) | Component (b) | 2.0 | VC (2) | 0.59 |
| Example 19 | EC/EMC (20/70) | Component (I) (10) | LiPF6 (1) | Component (b) | 2.0 | VC (2) | 0.88 |

TABLE 1-continued

| | Non-aqueous solvent (vol %) | Fluorine-containing non-aqueous solvent (vol %) | Non-aqueous electrolyte salt (mol/l) | Compound (III) | Amount (wt %) | Additive (wt %) | Gas amount (Δvol; ml) |
|---|---|---|---|---|---|---|---|
| Example 20 | EC/EMC (20/70) | Component (II) (10) | LiPF6 (1) | Component (b) | 2.0 | VC (2) | 0.96 |
| Example 21 | EC/EMC (20/70) | (2,2,2-trifluoroethyl)methylcarbonate (10) | LiPF6 (1) | Component (b) | 2.0 | VC (2) | 0.86 |
| Example 22 | EC/EMC (20/70) | (2,2,3,3-tetrafluoropropyl)methylcarbonate (10) | LiPF6 (1) | Component (b) | 2.0 | VC (2) | 0.61 |
| Example 23 | EC/PC/DMC (20/10/60) | FEC (10) | LiPF6 (1) | Component (b) | 2.0 | VC (2) | 0.73 |
| Example 24 | EC/PC/DEC (20/10/60) | FEC (10) | LiPF6 (1) | Component (b) | 2.0 | VC (2) | 0.69 |
| Example 25 | EC/PC/EMC/DEC (11/9/21/49) | FEC (10) | LiPF6 (1) | Component (b) | 2.0 | VC (2) | 0.61 |
| Example 27 | — | FEC/(2,2,2-trifluoroethyl)methylcarbonate (10/90) | LiPF6 (1) | Component (b) | 2.0 | — | 2.32 |
| Example 28 | — | FEC/(2,2,2-trifluoroethyl)methylcarbonate (1/99) | LiPF6 (1) | Component (b) | 2.0 | — | 1.79 |
| Example 29 | — | FEC/(2,2,2-trifluoroethyl)methylcarbonate (0.1/99.9) | LiPF6 (1) | Component (b) | 2.0 | — | 1.66 |

TABLE 2

| | Non-aqueous solvent (vol %) | Fluorine-containing non-aqueous solvent (vol %) | Non-aqueous electrolyte salt (mol/l) | Compound (III) | Amount (wt %) | Additive (wt %) | Gas amount (Δvol; ml) |
|---|---|---|---|---|---|---|---|
| Comparative Example 1 | EC/EMC (20/70) | FEC (10) | LiPF6 (1) | — | — | — | 1.26 |
| Comparative Example 2 | EC/EMC (20/70) | FEC (10) | LiPF6 (1) | — | — | VC (2) | 1.34 |
| Comparative Example 3 | EC/EMC (29.5/70) | FEC (0.5) | LiPF6 (1) | — | — | VC (2) | 0.56 |
| Comparative Example 4 | EC/EMC (17/58) | FEC (25) | LiPF6 (1) | — | — | VC (2) | 4.11 |
| Comparative Example 5 | EC/EMC (20/70) | DFEC (10) | LiPF6 (1) | — | — | VC (2) | 0.70 |
| Comparative Example 6 | EC/EMC (20/70) | Component (i) (10) | LiPF6 (1) | — | — | VC (2) | 1.10 |
| Comparative Example 7 | EC/EMC (20/70) | Component (ii) (10) | LiPF6 (1) | — | — | VC (2) | 1.02 |
| Comparative Example 8 | EC/EMC (9/31) | FEC (60) | LiPF6 (1) | — | — | VC (2) | 8.20 |
| Comparative Example 9 | EC/EMC (20/70) | (2,2,2-trifluoroethyl)methylcarbonate (10) | LiPF6 (1) | — | — | VC (2) | 0.98 |
| Comparative Example 10 | EC/EMC (20/70) | (2,2,3,3-tetrafluoropropyl)methylcarbonate (10) | LiPF6 (1) | — | — | VC (2) | 1.10 |
| Comparative Example 11 | EC/PC/DMC (20/10/60) | FEC (10) | LiPF6 (1) | — | — | VC (2) | 1.40 |
| Comparative Example 12 | EC/PC/DEC (20/10/60) | FEC (10) | LiPF6 (1) | — | — | VC (2) | 1.43 |
| Comparative Example 13 | EC/PC/EMC/DEC (11/9/21/49) | FEC (10) | LiPF6 (1) | — | — | VC (2) | 1.30 |
| Comparative Example 14 | — | FEC/(2,2,2-trifluoroethyl)methylcarbonate (30/70) | LiPF6 (1) | — | — | — | 2.80 |

INDUSTRIAL APPLICABILITY

The electrolyte solution of the present invention can be suitably used for electrochemical devices such as lithium ion secondary batteries.

The invention claimed is:

1. An electrolyte solution comprising
a non-aqueous solvent (I) containing one or both of a fluorinated cyclic carbonate and a fluorinated acyclic carbonate,
an electrolyte salt (II); and
a compound (III) represented by the following formula (1):

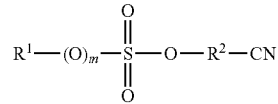

(1)

wherein $R^1$ is a C1-C20 linear or branched alkyl group or a C3-C20 alkyl group having a cyclic structure; m is 0; $R^2$ is a C1-C20 linear or branched alkylene group or a C3-C20 alkylene group having a cyclic structure, $R^1$ and $R^2$ each may have an oxygen atom between carbon atoms if $R^1$ and $R^2$ each have two or more carbon atoms, but the oxygen atom is not adjacent to another oxygen atom, wherein the compound (III) is present in an amount of 0.01 to 12 mass % in the electrolyte solution.

2. The electrolyte solution according to claim 1, wherein $R^1$ is —$CH_3$, —$CH_2$—$CH_3$, —$CH_2$—$CH_2$—$CH_3$, or —$CH(CH_3)$—$CH_3$.

3. The electrolyte solution according to claim 1, wherein $R^2$ is —$CH_2$—, —$CH_2$—$CH_2$—, or —$CH_2$—$CH_2$—$CH_2$—.

4. The electrolyte solution according to claim 1, wherein the non-aqueous solvent (I) at least contains a fluorinated acyclic carbonate.

5. An electrochemical device comprising the electrolyte solution according to claim 1.

6. A lithium ion secondary battery comprising the electrolyte solution according to claim 1.

7. A module comprising the lithium ion secondary battery according to claim 6.

8. The electrolyte solution according to claim 1, wherein the compound (III) is present in an amount of 0.01 to 10 mass % in the electrolyte solution.

9. The electrolyte solution according to claim 1, wherein the non-aqueous solvent (I) contains one or both of a fluorinated cyclic carbonate and a fluorinated acyclic carbonate, and wherein the fluorinated cyclic carbonate is present in an amount of 60 vol % or less of the non-aqueous solvent (I), and the fluorinated acyclic carbonate is present in an amount of 70 vol % or less of the non-aqueous solvent (I).

10. An electrolyte solution according to claim 1, wherein the fluorinated cyclic carbonate is at least one compound selected from the group consisting of compounds represented by the following formulas (2) to (6):

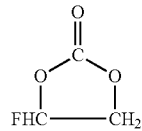

(2)

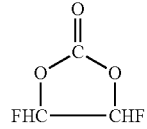

(3)

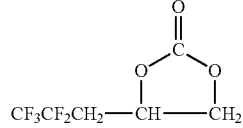

(4)

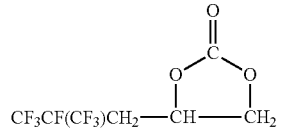

(5)

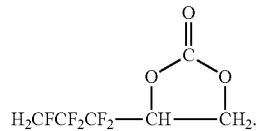

(6)

11. The electrolyte solution according to claim 1, wherein the fluorinated acyclic carbonate is at least one compound selected from the group consisting of (2,2,2-trifluoroethyl) methyl carbonate and (2,2,3,3-tetrafluoropropyl)methyl carbonate.

* * * * *